US012650547B1

(12) United States Patent

Govindasamy et al.

(10) Patent No.: US 12,650,547 B1

(45) Date of Patent: Jun. 9, 2026

(54) LIGHT PIPES AND ASSOCIATED ASSEMBLIES WITH UNIFORM ILLUMINATION AND HIGH EFFICIENCY

(71) Applicant: Amazon Technologies, Inc., Seattle, WA (US)

(72) Inventors: Gururaj Govindasamy, San Ramon, CA (US); Andrii Shekera, Vyshneve (UA)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/978,364

(22) Filed: Dec. 12, 2024

(51) Int. Cl.
*F21V 8/00* (2006.01)

(52) U.S. Cl.
CPC ... *G02B 6/0006* (2013.01); *H01H 2219/0622* (2013.01)

(58) Field of Classification Search
CPC ... G02B 6/0006; G02B 6/001; F21V 2200/15; F21V 2200/17; F21V 33/0004; F21V 2200/10; F21S 43/237; F21S 43/245; F21S 43/241; F21S 43/249; F21S 43/2492; H01H 2219/0622
See application file for complete search history.

(56) References Cited

U.S. PATENT DOCUMENTS

| | | | | |
|---|---|---|---|---|
| 6,474,859 | B2 * | 11/2002 | Lepley | G02B 6/0001 |
| | | | | 362/23.09 |
| 2006/0171137 | A1 * | 8/2006 | Tamaki | G01D 11/28 |
| | | | | 362/23.15 |
| 2006/0203485 | A1 * | 9/2006 | Fu | H01H 13/83 |
| | | | | 362/237 |
| 2012/0186958 | A1 * | 7/2012 | Yang | H01H 9/161 |
| | | | | 200/314 |
| 2012/0298493 | A1 * | 11/2012 | Hogan | H01H 13/83 |
| | | | | 200/314 |
| 2016/0076725 | A1 * | 3/2016 | Lin | F21S 43/249 |
| | | | | 362/545 |
| 2023/0154701 | A1 * | 5/2023 | Hong | H01H 19/14 |
| | | | | 200/336 |

FOREIGN PATENT DOCUMENTS

| | | | | | |
|---|---|---|---|---|---|
| AU | 2011253892 | B2 | * | 3/2015 | |
| DE | 102008042472 | A1 | * | 4/2010 | H01H 13/023 |
| EP | 4513523 | A1 | * | 2/2025 | H01H 13/14 |
| TW | 201315327 | A | * | 4/2013 | H01H 13/023 |

* cited by examiner

*Primary Examiner* — Erin Kryukova

(74) *Attorney, Agent, or Firm* — Athorus, PLLC

(57) ABSTRACT

A light pipe may comprise an elliptical body with a front face and a rear face. The front face may include an exit ring that is to be uniformly illuminated, and the rear face may include a plurality of light channels to receive light from respective light emitting diodes. The light channels may propagate received light at least partially circumferentially or elliptically around the body, and may reflect light toward an annular surface at an outer circumference of the rear face. Then, the annular surface may reflect light toward the exit ring, thereby generating uniform illumination while minimizing size, cost, and energy consumption. Further, the light pipe may be incorporated into a light pipe assembly including a button, a reflector, and a printed circuit board assembly, in which portions of the assembly may further facilitate propagation of light within the light pipe.

20 Claims, 18 Drawing Sheets

200A

200B

200C 205                    220C                    205

221C 241          241          241

200D

205

X COORDINATE VALUE

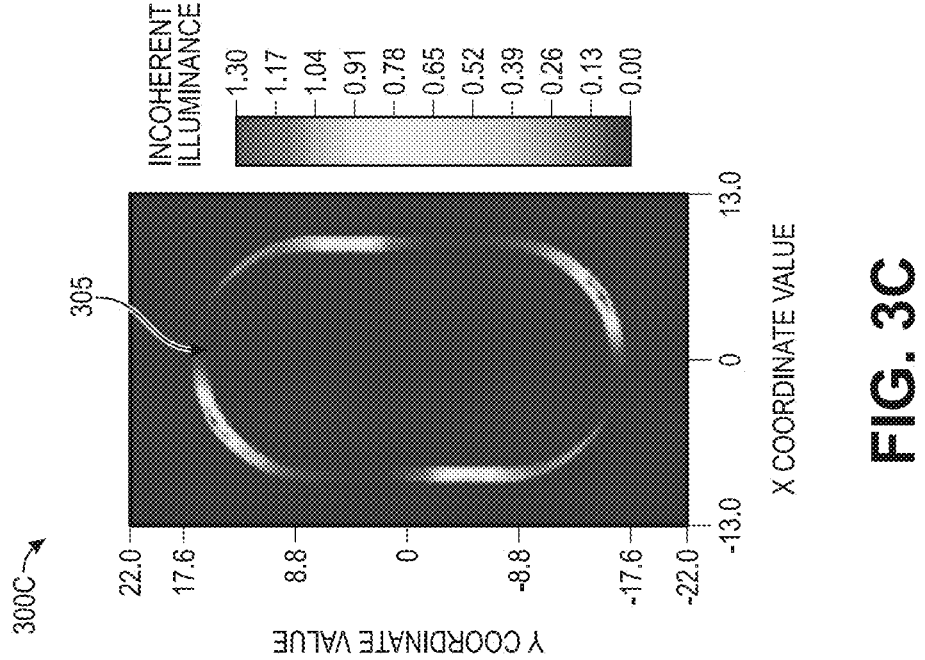
FIG. 3C
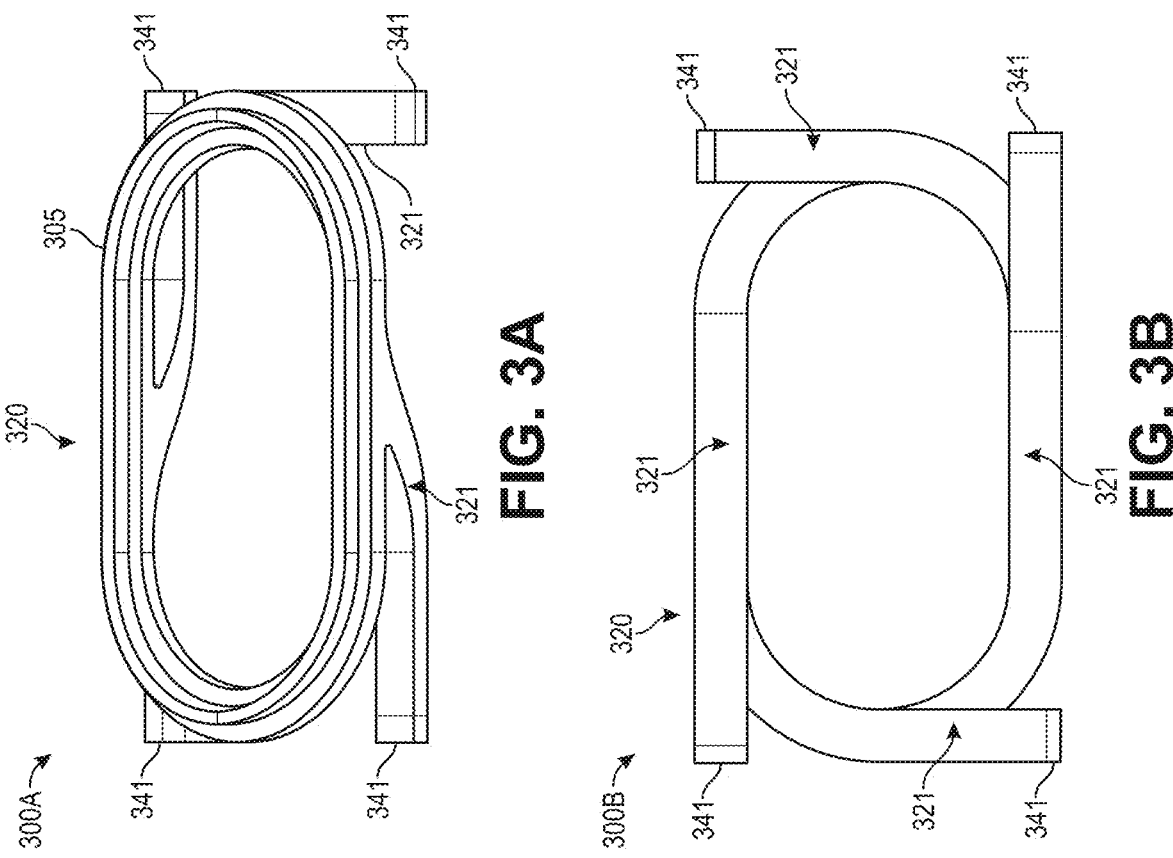
FIG. 3A
FIG. 3B

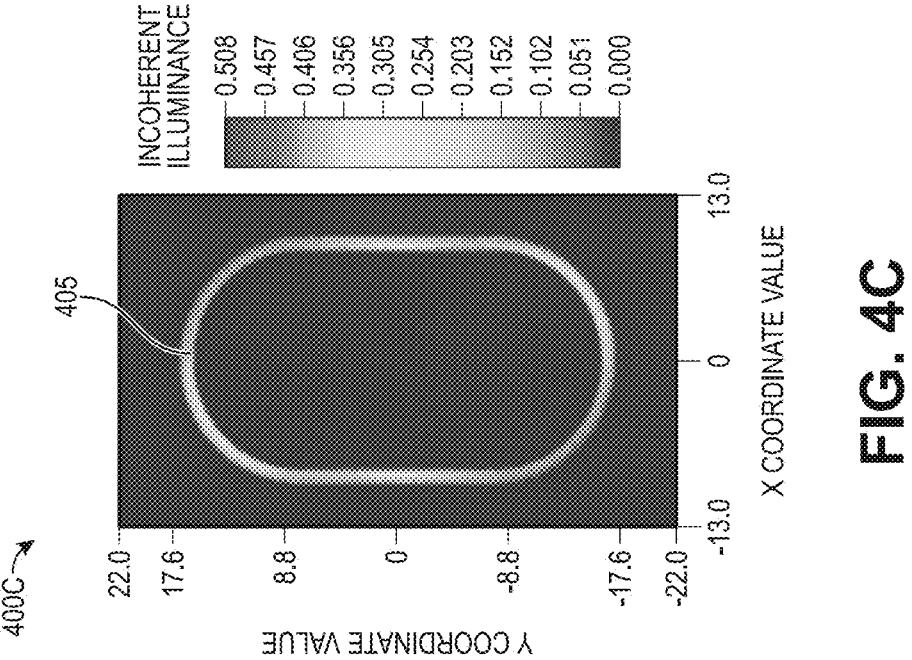
FIG. 4C
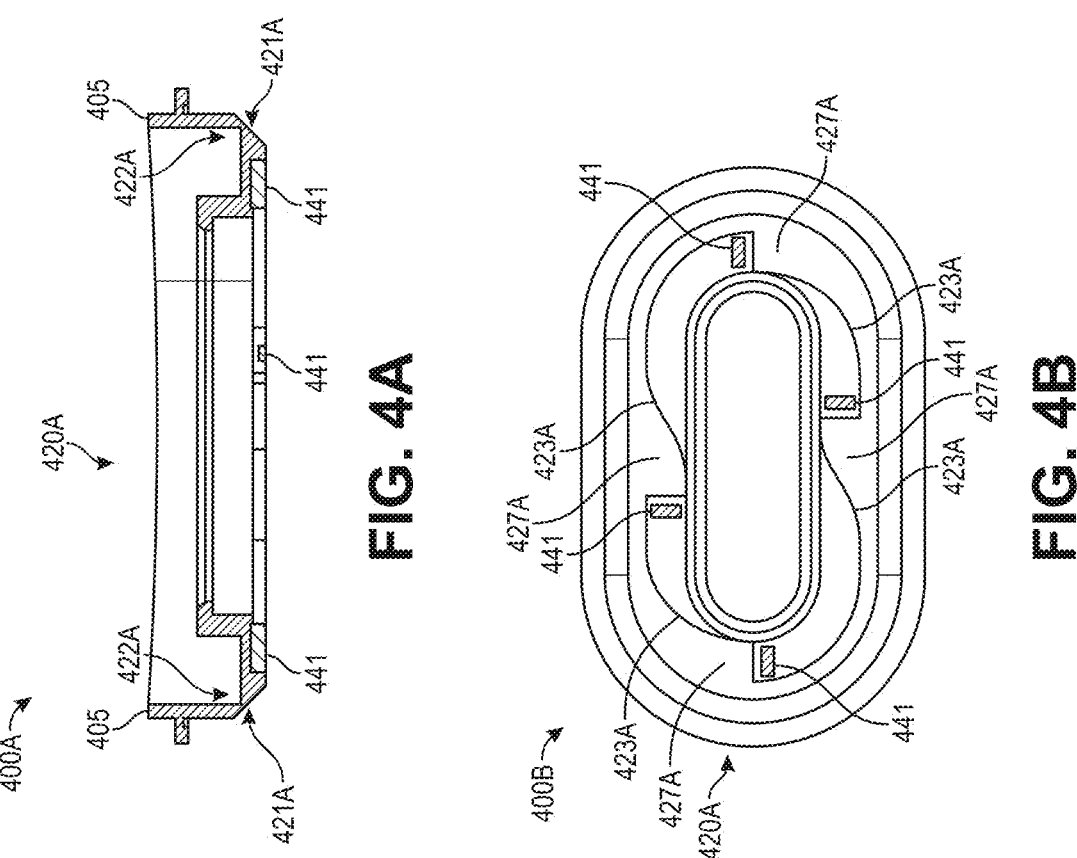
FIG. 4A
FIG. 4B

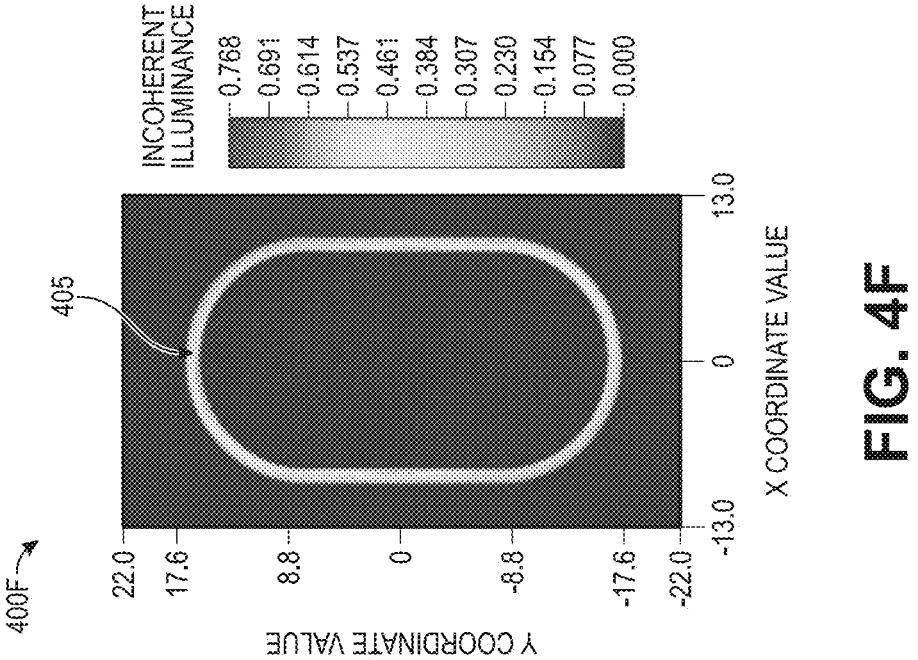
FIG. 4F
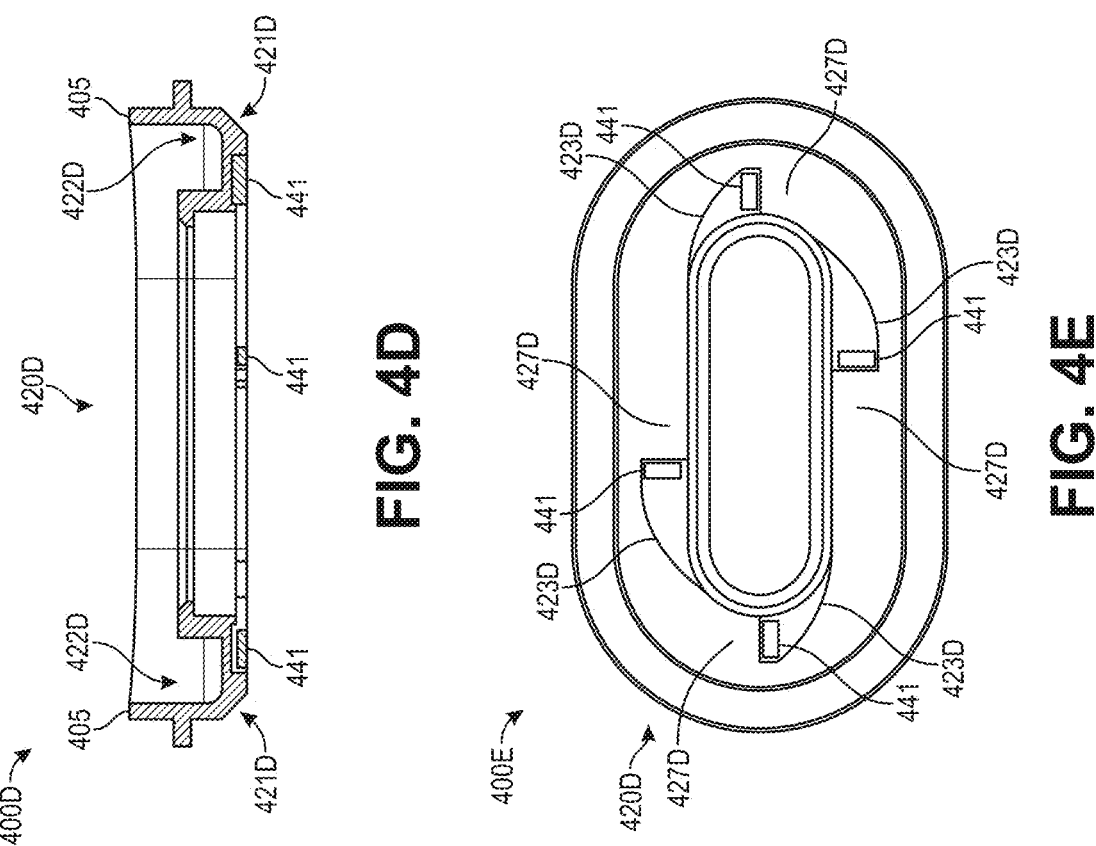
FIG. 4D
FIG. 4E

LIGHT PIPES AND ASSOCIATED ASSEMBLIES WITH UNIFORM ILLUMINATION AND HIGH EFFICIENCY

BACKGROUND

Various electronic devices, such as video doorbells, network connectivity devices, voice assistance devices, thermostats, vacuums, appliances, cameras, security systems, or other smart home or connected devices, may utilize lights as status indicators, such as status lights, bars, or rings. However, illumination of such indicators may not be uniform, and in order to increase uniformity of illumination, conventional devices may include additional light sources, thereby increasing both cost and energy consumption particularly for battery-operated devices. Accordingly, there is a need for light pipes and associated assemblies for various electronic devices that can provide uniform illumination while reducing both cost and energy consumption.

BRIEF DESCRIPTION OF THE DRAWINGS

FIG. 3A is a schematic side, perspective view diagram of a fourth example light pipe, in accordance with implementations of the present disclosure.

FIG. 3B is a schematic rear view diagram of the fourth example light pipe of FIG. 3A, in accordance with implementations of the present disclosure.

FIG. 3C is a graph of simulated illumination for the fourth example light pipe of FIG. 3A, in accordance with implementations of the present disclosure.

FIG. 4A is a schematic side, cross-sectional view diagram of a fifth example light pipe, in accordance with implementations of the present disclosure.

FIG. 4B is a schematic rear view diagram of the fifth example light pipe of FIG. 4A, in accordance with implementations of the present disclosure.

FIG. 4C is a graph of simulated illumination for the fifth example light pipe of FIG. 4A, in accordance with implementations of the present disclosure.

FIG. 4D is a schematic side, cross-sectional view diagram of a sixth example light pipe, in accordance with implementations of the present disclosure.

FIG. 4E is a schematic rear view diagram of the sixth example light pipe of FIG. 4D, in accordance with implementations of the present disclosure.

FIG. 4F is a graph of simulated illumination for the sixth example light pipe of FIG. 4D, in accordance with implementations of the present disclosure.

DETAILED DESCRIPTION

Figure 1A:
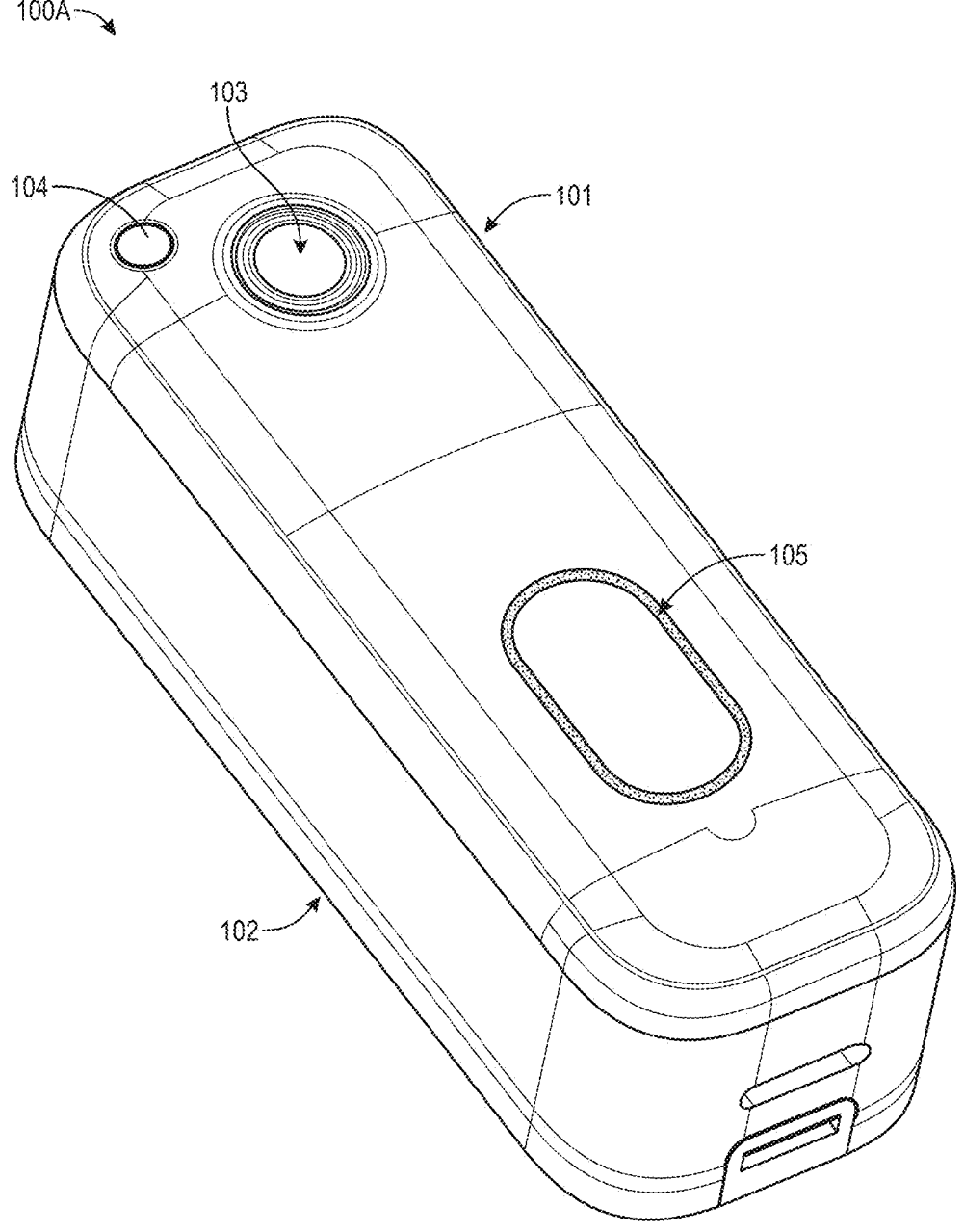
FIG. 1A is a schematic front perspective view diagram of an example video doorbell including a light pipe assembly, in accordance with implementations of the present disclosure.

As is set forth in greater detail below, implementations of the present disclosure are directed to light pipes and associated assemblies for various electronic devices that can provide uniform illumination while reducing both cost and energy consumption.

In example embodiments, a light pipe may comprise a body having an elliptical shape that is configured to receive and direct light from a plurality of light emitting diodes (LEDs) to an exit ring that is configured to emit light or to be illuminated. An elliptical shape as described herein may comprise various shapes including stadium, pill, or discorectangular (e.g., rectangular with opposing curved or semicircular ends), ellipse, oval, round, circular, or similar shapes. The body may be formed of plastics or various other materials that enable propagation of light rays within the body, e.g., Makrolon® 2805 polycarbonate plastic or similar materials. In addition, the body may have a front face including the exit ring that is visible from a front or other portion of an electronic device in which the light pipe is used or assembled, e.g., generally facing a customer or user of the electronic device. Further, along or within a rear face of the body, a plurality of light channels may be formed to receive light from respective LEDs, and the plurality of light channels may extend at least partially circumferentially or elliptically around the body.

For example, light may be received by the plurality of light channels in an initial direction that is substantially parallel to the exit ring and front face of the body. The light channels may then direct and reflect the light at least partially circumferentially or elliptically around the body, radially outward to an outer circumference of the body, and eventually toward the exit ring of the front face, thereby providing substantially uniform illumination of the exit ring. The outer circumference of the body may comprise an annular surface having a chamfer or curve that is configured to reflect or direct the light toward the exit ring. Various other dimensions and attributes of the body of the light pipe may be selected, designed, or configured to direct, reflect, and/or propagate light to the exit ring, including various thicknesses, offsets, gaps, chamfers, curves, fillets, angles, surfaces, or other attributes. Further, the plurality of LEDs may generally emit light having a same color, e.g., white, blue, green, or other colors, to provide uniform illumination of the exit ring in a single color.

In some example embodiments, the light pipe may have an elliptical shape, such as a stadium, pill, or discorectangular shape, and include four light channels that receive light from four respective LEDs, e.g., one LED for each of the four light channels. In other example embodiments, the light pipe may have other shapes, sizes, or dimensions and include other numbers of light channels that receive light from a corresponding number of respective LEDs. For example, a light pipe having an elliptical shape, such as an oval, stadium, pill, discorectangular, round, or circular shape, may include two light channels that receive light from two respective LEDs, e.g., one LED for each of the two light channels. Various example embodiments described herein may comprise two, three, four, or other numbers of light channels and respective LEDs.

In additional example embodiments, a light pipe assembly may be formed that includes a light pipe as described herein, a reflector, a printed circuit board assembly (PCBA), a button, and/or a protective vent or filter. The light pipe assembly may be formed and installed to an electronic device, e.g., to a front cover or user-facing portion of a device. In order to maintain or improve brightness of illumination of the exit ring of the light pipe, one or more components of the light pipe assembly may comprise a white, glossy surface finish. For example, some or all surfaces of the light pipe with the exception of the exit ring, at least a surface of the reflector that mates with or substantially corresponds to the outer circumference of the rear face of the light pipe, at least a front face of the PCBA that mates with a rear face of the light pipe, at least an inner surface or inner part of the button that mates with a front face of the light pipe, and/or various other surfaces or portions of the components may be formed of white material, painted white, and/or polished to have a glossy surface finish. By providing white, glossy surface finishes to components of the light pipe assembly, the illumination of the exit ring may remain bright and uniform, even if the light pipe assembly is housed within or at least partially surrounded by black, dark, or otherwise light-absorbing colors or portions of an electronic device.

Figure 1B:
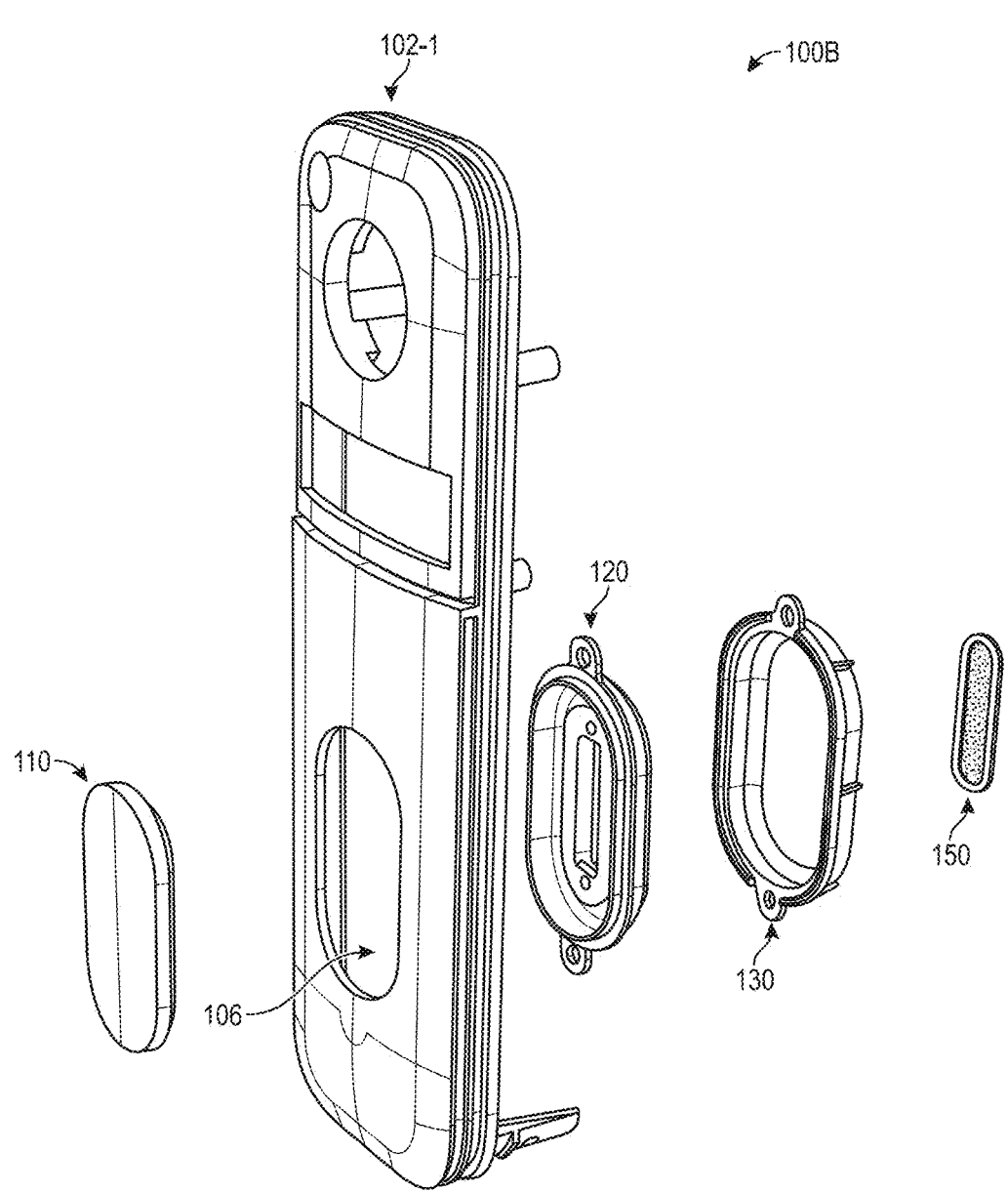
FIG. 1B is a schematic perspective, exploded view diagram of a front portion of the example video doorbell of FIG. 1A including the light pipe assembly, in accordance with implementations of the present disclosure.

FIG. 1A is a schematic front perspective view diagram 100A of an example video doorbell including a light pipe assembly, in accordance with implementations of the present disclosure, and FIG. 1B is a schematic perspective, exploded view diagram 100B of a front portion of the example video doorbell of FIG. 1A including the light pipe assembly, in accordance with implementations of the present disclosure.

As shown in FIG. 1A, an example electronic device 101, e.g., a video doorbell, may comprise a housing or cover 102, an imaging device 103, a speaker and/or microphone 104, and a light pipe assembly having an exit ring 105. The housing or cover 102 may comprise one or more parts or portions that mate or engage together to substantially house, enclose, or surround various components of the electronic device 101. For example, the housing or cover 102 may have various shapes, sizes, or dimensions, and may be formed of various materials, such as plastics, metals, or other materials.

In the example electronic device 101 of FIG. 1A that comprises a video doorbell, the housing or cover 102 may at least partially enclose or surround the imaging device 103, the speaker and/or microphone 104, and/or the light pipe assembly having the exit ring 105. For example, the imaging device 103 may capture imaging data of an environment proximate the video doorbell, e.g., a user facing a front portion of the video doorbell. In addition, the speaker and/or microphone 104 may emit and/or capture audio data relative to an environment proximate the video doorbell, e.g., associated with or around a front portion of the video doorbell. Further, the light pipe assembly may receive and direct light to the exit ring 105 with substantially uniform illumination and brightness. Moreover, the housing or cover 102 may enclose or surround various printed circuit board assemblies, light emitting diodes, processors, memories, communication devices, switches, connectors, batteries, and/or other electronic components that perform various functions or operations associated with the electronic device.

As shown in FIG. 1B, a front portion of the example electronic device 101 may comprise a front cover 102-1 with an orifice 106, and a light pipe assembly including a button 110, a light pipe 120, a reflector 130, a printed circuit board assembly (not illustrated), and a protective vent or filter 150. The front cover 102-1 may comprise a part or portion of a housing or cover 102 described herein with respect to FIG. 1A. In addition, further details of various features of the printed circuit board assembly are described herein at least with respect to FIGS. 7A-7B, and 8E.

In example embodiments, at least a portion of the light pipe 120, e.g., an exit ring 105 of a front face as shown in FIG. 1A, may be configured to be installed or inserted into the orifice 106 of the front cover 102-1, such that the exit ring 105 is visible and illuminated for a user of the electronic device 101. When installed or inserted, an outer surface of the exit ring 105 may be substantially flush with an outer surface of the front cover 102-1. The light pipe 120 may have various features, structures, or other attributes that are configured to receive and direct light from one or more light emitting diodes (LEDs) toward the exit ring 105. Further details of various features of the light pipe 120 are described herein at least with respect to FIGS. 2A-7B, 8A, and 9A-9B.

The button 110 may be configured to be installed or inserted into a front face of the light pipe 120, and within the orifice 106 of the front cover 102-1. When installed or inserted, an outer surface of the button 110 may be substantially flush with an outer surface of the front cover 102-1 and exit ring 105. The button 110 may interact with a switch or other electronic components within the electronic device 101, in order to perform one or more operations. For the example video doorbell, actuation of a switch via the button 110 may initiate capture of imaging data by the imaging device 103, emission and/or capture of sounds by the speaker and/or microphone 104, transmission of various data to other devices or systems via communication devices, and/or various other operations. Further details of various features of the button 110 are described herein at least with respect to FIGS. 7A-7B, 8B-8D, and 9A-9B.

The reflector 130 may be configured to be installed or assembled to or with a rear face and/or outer circumference of the light pipe 120. When installed or inserted, a corresponding surface of the reflector 130 may substantially mate or engage with the outer circumference of the rear face of the light pipe 120. For example, at least the mating surface of the reflector 130 may be configured to assist with reflecting or directing light within the light pipe 120 and toward the exit ring 105. Further details of various features of the reflector 130 are described herein at least with respect to FIGS. 7A-7B, 8A, and 9A-9B.

The protective vent or filter 150 may be configured to be installed, inserted, or adhered into a central portion of the light pipe 120. When installed, inserted, or adhered, the protective filter 150 may comprise a thin film, sheet, or other shielding material that prevents ingress of dust, moisture, or other particulates from an environment into an interior of the electronic device 101. For example, the protective filter 150 may prevent ingress of dust or moisture via mating or interfacing surfaces of the button 110 and light pipe 120, thereby preventing dust or moisture from reaching various internal parts or electronic components within the electronic device 101, e.g., printed circuit board assemblies, light emitting diodes, switches, batteries, and others.

Figure 2A:
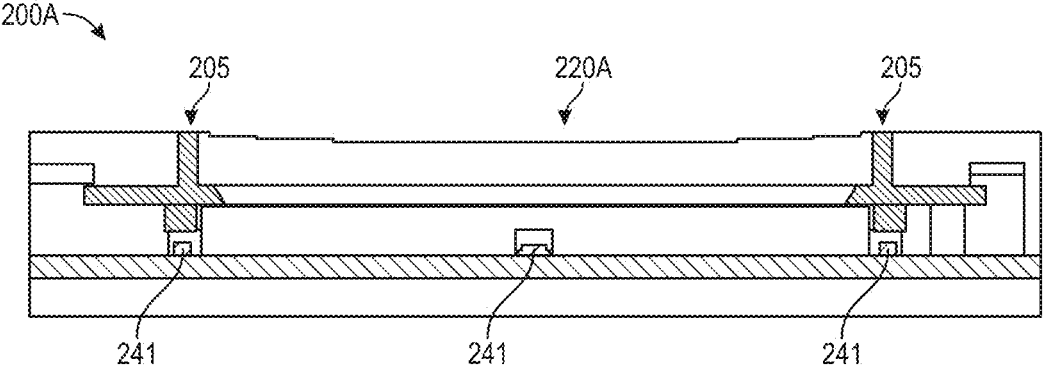
FIG. 2A is a schematic side, cross-sectional view diagram of a first example light pipe, in accordance with implementations of the present disclosure.
Figure 2B:
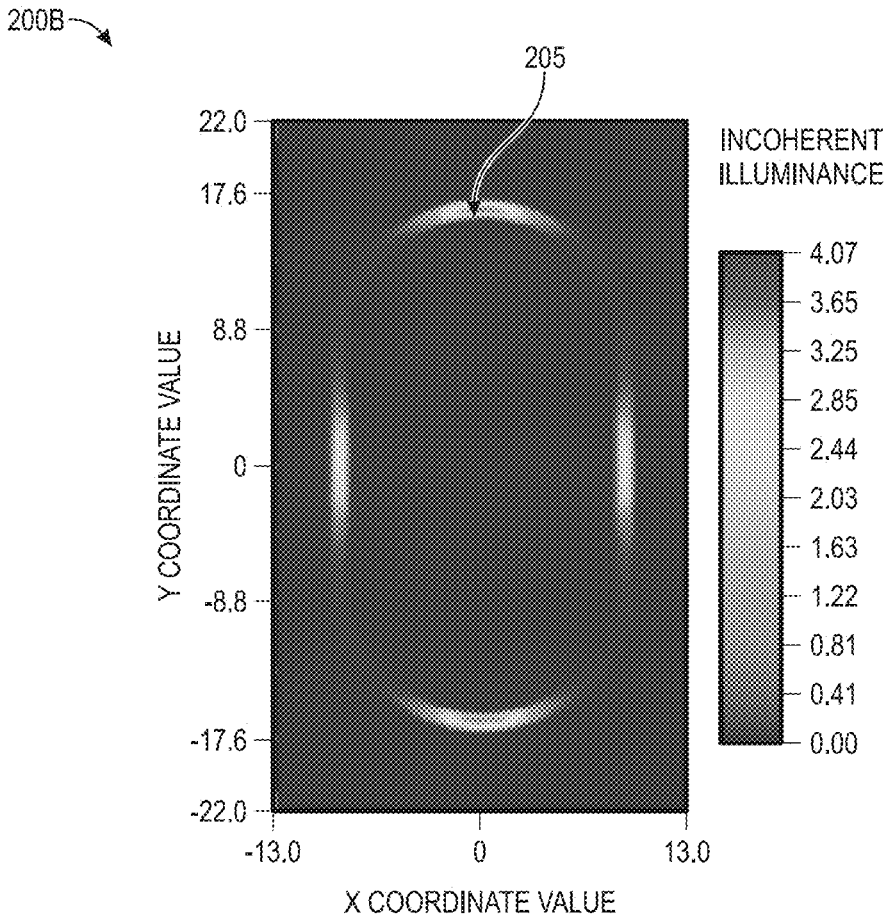
FIG. 2B is a graph of simulated illumination for the first example light pipe of FIG. 2A, in accordance with implementations of the present disclosure.

FIG. 2A is a schematic side, cross-sectional view diagram 200A of a first example light pipe, in accordance with implementations of the present disclosure, and FIG. 2B is a graph 200B of simulated illumination for the first example light pipe of FIG. 2A, in accordance with implementations of the present disclosure.

As shown in the cross-sectional view of FIG. 2A, a first example light pipe 220A may comprise a body having an elliptical shape. A front face of the light pipe 220A may be positioned toward an upper portion of FIG. 2A, and a rear face of the light pipe 220A may be positioned toward a lower portion of FIG. 2A.

At the front face of the light pipe 220A, an exit ring 205 may be formed as part of the body. In addition, at a rear face of the light pipe 220A, one or more LEDs 241 may be positioned proximate interfaces or portions of the light pipe 220A that are configured to receive light. The one or more LEDs 241 may be coupled or attached to a printed circuit board assembly, and may be configured to emit light toward and into the light pipe 220A, in order to illuminate the exit ring 205.

In the example of FIGS. 2A and 2B, four LEDs 241 may be positioned around the elliptical shape of the body of the light pipe 220A, e.g., first and second LEDs positioned at approximate centers of opposing straight portions of the elliptical shape, and third and fourth LEDs positioned at approximate centers of opposing curved portions of the elliptical shape. The four LEDs 241 may be approximately equally spaced apart from each other around the elliptical shape of the body. In addition, each of the four LEDs 241 may be positioned and oriented to emit light directly toward the exit ring 205, e.g., to emit light directly upward in the drawing of FIG. 2A.

As shown in FIG. 2B, the graph of simulated illumination of the light pipe 220A may illustrate a view when facing the front face of the light pipe 220A, e.g., when looking down on the light pipe 220A and exit ring 205 from an upper portion of FIG. 2A. Because the four LEDs 241 direct light substantially directly toward the exit ring 205 of the light pipe 220A, substantially only portions of the exit ring 205 that are directly aligned with the direction of emitted light may be illuminated, e.g., only approximate centers of opposing straight portions and approximate centers of opposing curved portions of the elliptical shape may be illuminated. As a result, the light pipe 220A may not create or generate substantially uniform illumination for all portions of the exit ring 205.

Figure 2C:
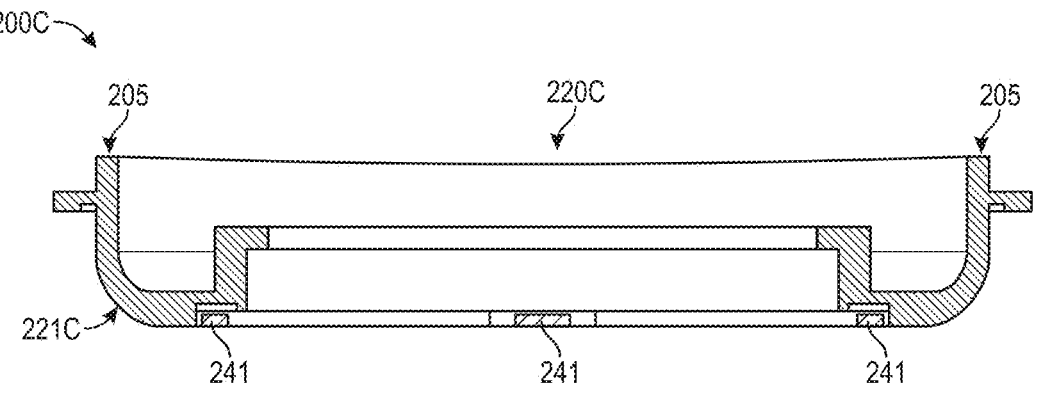
FIG. 2C is a schematic side, cross-sectional view diagram of a second example light pipe, in accordance with implementations of the present disclosure.
Figure 2D:
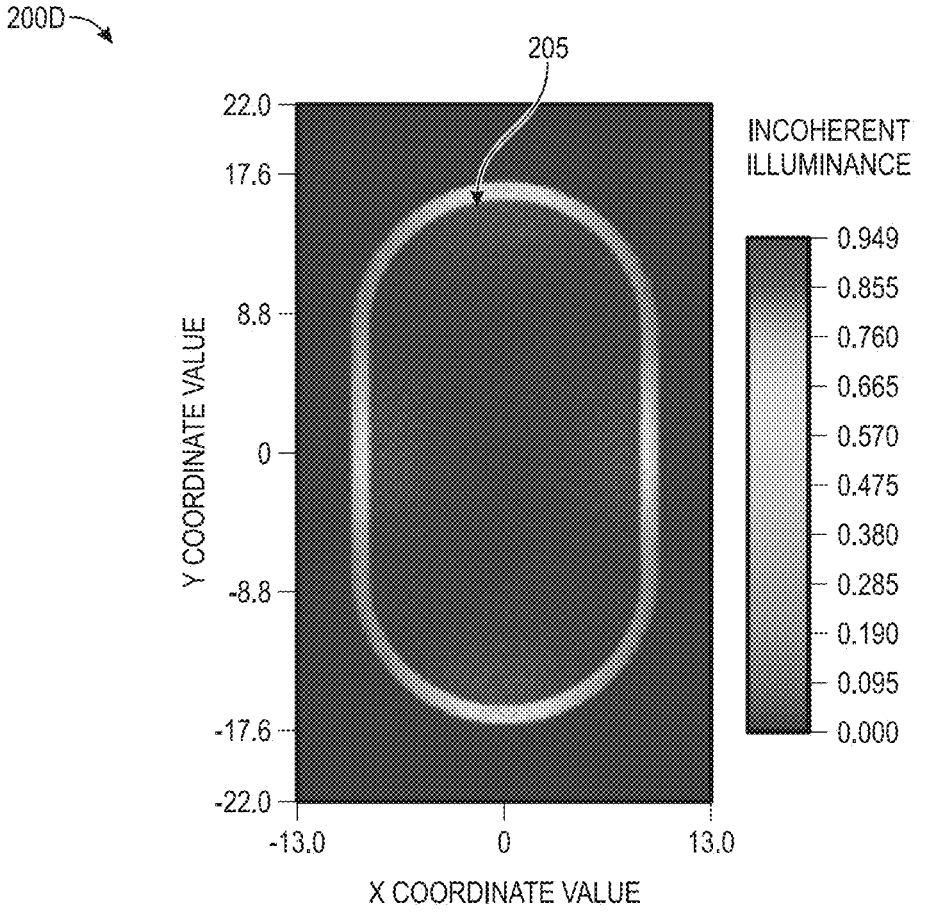
FIG. 2D is a graph of simulated illumination for the second example light pipe of FIG. 2C, in accordance with implementations of the present disclosure.

FIG. 2C is a schematic side, cross-sectional view diagram 200C of a second example light pipe, in accordance with implementations of the present disclosure, and FIG. 2D is a graph 200D of simulated illumination for the second example light pipe of FIG. 2C, in accordance with implementations of the present disclosure.

As shown in the cross-sectional view of FIG. 2C, a second example light pipe 220C may comprise a body having an elliptical shape. A front face of the light pipe 220C may be positioned toward an upper portion of FIG. 2C, and a rear face of the light pipe 220C may be positioned toward a lower portion of FIG. 2C.

At the front face of the light pipe 220C, an exit ring 205 may be formed as part of the body. In addition, at a rear face of the light pipe 220C, one or more LEDs 241 may be positioned proximate interfaces or portions of the light pipe 220C that are configured to receive light. The one or more LEDs 241 may be coupled or attached to a printed circuit board assembly, and may be configured to emit light toward and into the light pipe 220C, in order to illuminate the exit ring 205. Between the front and rear faces of the light pipe 220C, a curved or arcuate surface 221C may be formed continuously around an outer circumference of the rear face. The curved surface 221C may reflect and propagate light that is received from the LEDs 241 toward the exit ring 205.

In the example of FIGS. 2C and 2D, four LEDs 241 may be positioned around the elliptical shape of the body of the light pipe 220C, e.g., first and second LEDs positioned near approximate centers of opposing straight portions of the elliptical shape, and third and fourth LEDs positioned near approximate centers of opposing curved portions of the elliptical shape. The four LEDs 241 may be approximately equally spaced apart from each other around the elliptical shape of the body. In addition, each of the four LEDs 241 may be positioned and oriented to emit light in a direction substantially parallel to the front and rear faces of the light pipe 220C, and also radially outward from a center of the light pipe 220C. For example, a leftmost LED 241 illustrated in FIG. 2C may emit light substantially toward a left side of the drawing of FIG. 2C, a central LED 241 illustrated in FIG. 2C may emit light substantially into the page of the drawing of FIG. 2C, and a rightmost LED 241 illustrated in FIG. 2C may emit light substantially toward a right side of the drawing of FIG. 2C.

As shown in FIG. 2D, the graph of simulated illumination of the light pipe 220C may illustrate a view when facing the front face of the light pipe 220C, e.g., when looking down on the light pipe 220C and exit ring 205 from an upper portion of FIG. 2C. Because the four LEDs 241 direct light substantially radially outward toward the curved surface 221C, via which the light is then reflected and propagated toward the exit ring 205 of the light pipe 220C, portions of the exit ring 205 that are more directly aligned with the direction of reflected and propagated light may be more highly illuminated, e.g., approximate centers of opposing straight portions and approximate centers of opposing curved portions of the elliptical shape may be more highly illuminated. Nonetheless, because the emitted light from the LEDs 241 is reflected and propagated via the curved surface 221C toward the exit ring 205, other portions of the exit ring 205 may be somewhat more illuminated in the graph of FIG. 2D, as compared to the graph of FIG. 2B. However, the light pipe 220C may not create or generate substantially uniform illumination for all portions of the exit ring 205.

Figures 2E, 2F:
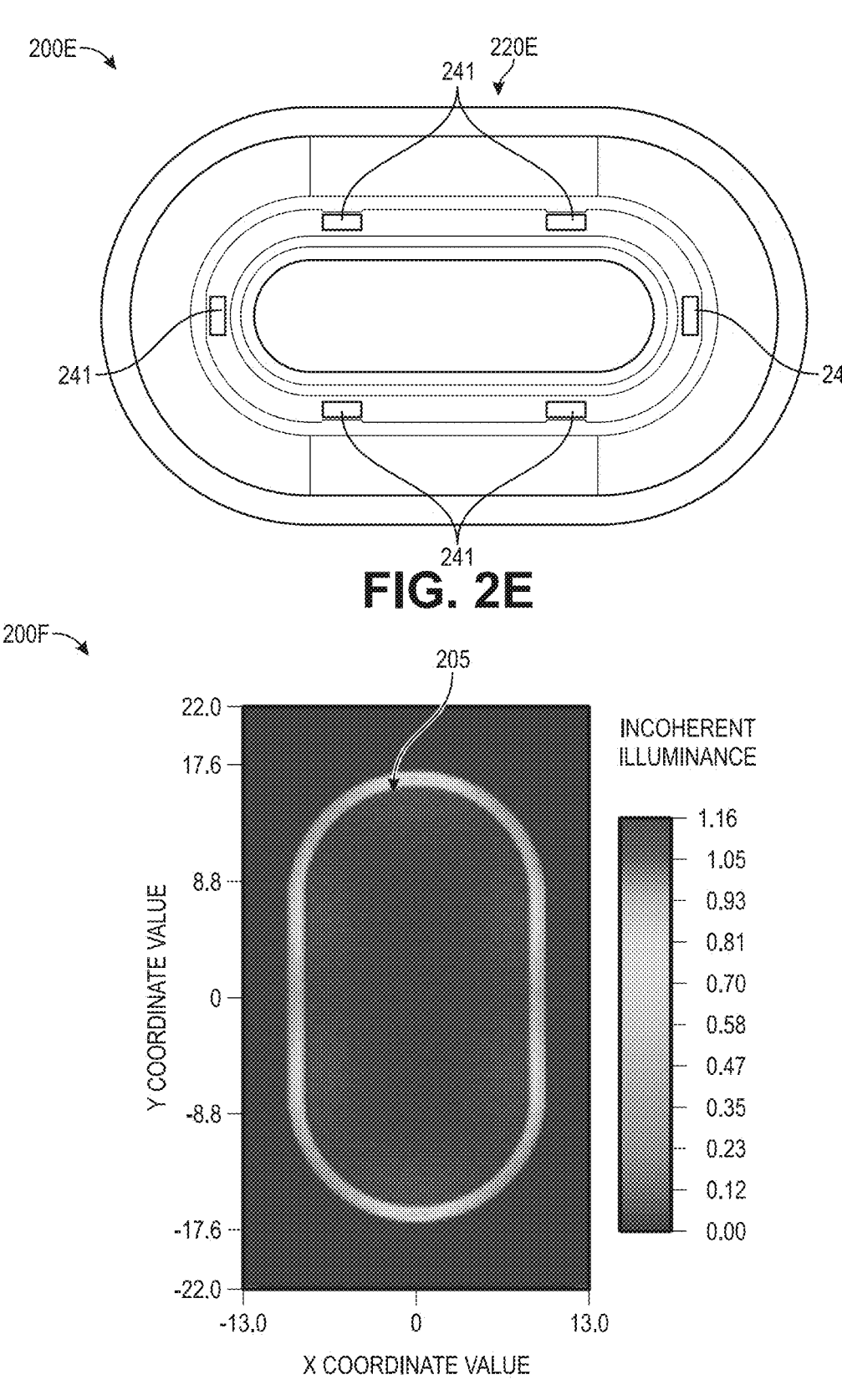
FIG. 2E is a schematic rear view diagram of a third example light pipe, in accordance with implementations of the present disclosure.
FIG. 2F is a graph of simulated illumination for the third example light pipe of FIG. 2E, in accordance with implementations of the present disclosure.

FIG. 2E is a schematic rear view diagram 200E of a third example light pipe, in accordance with implementations of the present disclosure, and FIG. 2F is a graph 200F of simulated illumination for the third example light pipe of FIG. 2E, in accordance with implementations of the present disclosure.

As shown in the rear view of FIG. 2E, a third example light pipe 220E may comprise a body having an elliptical shape. A front face of the light pipe 220E may be facing into the drawing of FIG. 2E, and a rear face of the light pipe 220E is illustrated in the drawing of FIG. 2E.

The light pipe 220E of FIGS. 2E and 2F may be substantially identical to the light pipe 220C of FIGS. 2C and 2D. For example, the light pipe 220E may have the same or similar exit ring 205 at a front face, interfaces to LEDs 241 at a rear face, and a curved or arcuate surface 221C formed continuously around an outer circumference of the rear face, as described with respect to FIGS. 2C and 2D. In addition, one or more LEDs 241 may be coupled or attached to a printed circuit board assembly, and may be configured to emit light toward and into the light pipe 220E, in order to illuminate the exit ring 205.

In contrast to the example of FIGS. 2C and 2D, six LEDs 241 may be positioned around the elliptical shape of the body of the light pipe 220E of FIGS. 2E and 2F, e.g., first, second, third, and fourth LEDs positioned along opposing straight portions of the elliptical shape, and fifth and sixth LEDs positioned near approximate centers of opposing curved portions of the elliptical shape. The six LEDs 241 may be approximately equally spaced apart from each other around the elliptical shape of the body. In addition, each of the six LEDs 241 may be positioned and oriented to emit light in a direction substantially parallel to the front and rear faces of the light pipe 220E, and also radially outward from a center of the light pipe 220E. For example, a leftmost LED 241 illustrated in FIG. 2E may emit light substantially toward a left side of the drawing of FIG. 2E, the two upper LEDs 241 illustrated in FIG. 2E may emit light substantially toward an upper portion of the drawing of FIG. 2E, the two lower LEDs 241 illustrated in FIG. 2E may emit light substantially toward a lower portion of the drawing of FIG. 2E, and a rightmost LED 241 illustrated in FIG. 2E may emit light substantially toward a right side of the drawing of FIG. 2E.

As shown in FIG. 2F, the graph of simulated illumination of the light pipe 220E may illustrate a view when facing the front face of the light pipe 220E, e.g., when looking toward the light pipe 220E and exit ring 205 from inside the page of the drawing of FIG. 2E. Because the six LEDs 241 direct light substantially radially outward toward the curved surface 221C, via which the light is then reflected and propagated toward the exit ring 205 of the light pipe 220E, portions of the exit ring 205 that are more directly aligned with the direction of reflected and propagated light may be more highly illuminated, e.g., sections of opposing straight portions and approximate centers of opposing curved portions of the elliptical shape may be more highly illuminated. Nonetheless, because the emitted light from the LEDs 241 is reflected and propagated via the curved surface 221C toward the exit ring 205, other portions of the exit ring 205 may be somewhat more illuminated in the graph of FIG. 2F, as compared to the graph of FIG. 2D. However, the light pipe 220E may not create or generate substantially uniform illumination for all portions of the exit ring 205. Moreover, because a greater number of LEDs 241, e.g., six LEDs instead of four LEDs, is used to generate illumination of the exit ring 205, the light pipe 220E may have associated increased cost and energy consumption.

FIG. 3A is a schematic side, perspective view diagram 300A of a fourth example light pipe, in accordance with implementations of the present disclosure, FIG. 3B is a schematic rear view diagram 300B of the fourth example light pipe of FIG. 3A, in accordance with implementations of the present disclosure, and FIG. 3C is a graph 300C of simulated illumination for the fourth example light pipe of FIG. 3A, in accordance with implementations of the present disclosure.

As shown in the perspective and rear views of FIGS. 3A and 3B, a fourth example light pipe 320 may comprise a body having an elliptical shape. A front face of the light pipe 320 may be facing generally upward and outward from the drawing of FIG. 3A, and a rear face of the light pipe 320 may be facing generally downward and inward into the drawing of FIG. 3A, the rear face also being illustrated in the drawing of FIG. 3B.

At the front face of the light pipe 320, an exit ring 305 may be formed as part of the body. In addition, at a rear face of the light pipe 320, one or more LEDs 341 may be positioned proximate interfaces or portions of the light pipe 320 that are configured to receive light. The one or more LEDs 341 may be coupled or attached to a printed circuit board assembly, and may be configured to emit light toward and into the light pipe 320, in order to illuminate the exit ring 305. As illustrated, the LEDs 341 may be positioned substantially outside an outer periphery of the elliptical shape of the light pipe 320. Between the front and rear faces of the light pipe 320, a plurality of curved arms 321 may be formed that extend between the LEDs 341, and remaining portions of the light pipe 320 and exit ring 305. The curved arms 321 may direct, reflect, and propagate light that is received from the LEDs 341 toward the exit ring 305.

In the example of FIGS. 3A-3C, four LEDs 341 may be positioned outside and around an outer periphery of the elliptical shape of the body of the light pipe 320, e.g., each LED positioned near an approximate corner outside of the elliptical shape. In addition, each of the four LEDs 341 may be positioned and oriented to emit light in a direction substantially parallel to the front and rear faces of the light pipe 320, and also circumferentially or elliptically around a center of the light pipe 320. For example, in the rear view of FIG. 3B, the four LEDs 341 may emit light directly toward or into respective curved arms 321, such that the light is reflected and propagated in an approximately clockwise circumferential or elliptical direction around a center of the light pipe 320 illustrated in FIG. 3B.

As shown in FIG. 3C, the graph of simulated illumination of the light pipe 320 may illustrate a view when facing the front face of the light pipe 320, e.g., when looking generally downward and inward onto the light pipe 320 and exit ring 305 from an upper portion of FIG. 3A. Because the four LEDs 341 direct light substantially directly toward and into respective curved arms 321, via which the light is then reflected and propagated at least partially circumferentially or elliptically around the light pipe 320 and toward exit ring 305, portions of the exit ring 305 that are more directly aligned with or proximate the curved arms 321 that direct and propagate the light may be more highly illuminated, e.g., approximately offset corners of the elliptical shape may be more highly illuminated. As a result, the light pipe 320 may not create or generate substantially uniform illumination for all portions of the exit ring 305. Moreover, because the LEDs 341 are positioned outside an outer periphery of the light pipe 320 and because the curved arms 321 extend between a remainder of the light pipe 320 and the LEDs 341, the light pipe 320 may have associated increased size and cost, thereby requiring more physical space within electronic devices that may generally have size constraints or requirements.

FIG. 4A is a schematic side, cross-sectional view diagram 400A of a fifth example light pipe, in accordance with implementations of the present disclosure, FIG. 4B is a schematic rear view diagram 400B of the fifth example light pipe of FIG. 4A, in accordance with implementations of the present disclosure, and FIG. 4C is a graph 400C of simulated illumination for the fifth example light pipe of FIG. 4A, in accordance with implementations of the present disclosure.

As shown in the cross-sectional and rear views of FIGS. 4A and 4B, a fifth example light pipe 420A may comprise a body having an elliptical shape. A front face of the light pipe 420A may be positioned toward an upper portion of FIG. 4A, and a rear face of the light pipe 420A may be positioned toward a lower portion of FIG. 4A, the rear face also being illustrated in the drawing of FIG. 4B.

At the front face of the light pipe 420A, an exit ring 405 may be formed as part of the body. In addition, at a rear face of the light pipe 420A, one or more LEDs 441 may be positioned proximate interfaces or portions of the light pipe 420A that are configured to receive light. The one or more LEDs 441 may be coupled or attached to a printed circuit board assembly, and may be configured to emit light toward and into the light pipe 420A, in order to illuminate the exit ring 405. As illustrated, the LEDs 441 may be positioned substantially within an outer periphery and received within portions of the rear face of the elliptical shape of the light pipe 420A.

Between the front and rear faces of the light pipe 420A, a chamfered surface 421A may be formed continuously around an outer circumference of the rear face. The chamfered surface 421A may reflect and propagate light that is received from the LEDs 441 toward the exit ring 405. For example, the chamfered surface 421A may form an approximate forty-five degree angle with the rear face of the light pipe 420A. In addition, a corner or edge 422A may be formed continuously around an inner portion of the light pipe 420A that is substantially opposed to the chamfered surface 421A, and the corner or edge 422A may also cooperate with the chamfered surface 421A to direct and propagate light toward the exit ring 405.

In the example of FIGS. 4A-4C, four LEDs 441 may be positioned around the elliptical shape of the body of the light pipe 420A, e.g., first and second LEDs positioned slightly offset from approximate centers of opposing straight portions of the elliptical shape, and third and fourth LEDs positioned slightly offset from approximate centers of opposing curved portions of the elliptical shape. The four LEDs 441 may be approximately equally spaced apart from each other around the elliptical shape of the body.

In addition, each of the four LEDs 441 may be positioned and oriented to emit light in a direction substantially parallel to the front and rear faces of the light pipe 420A, and also circumferentially or elliptically around a center of the light pipe 420A. For example, in the rear view of FIG. 4B, the four LEDs 441 may emit light directly toward or into respective light channels 427A, such that the light is reflected and propagated in an approximately clockwise circumferential or elliptical direction around a center of the light pipe 420A illustrated in FIG. 4B. In addition, the plurality of light channels 427A may be at least partially defined or bounded by curved or arcuate surfaces 423A that facilitate reflection and propagation of light received from the LEDs 441 to one or more directions at least partially radially outward away from a center of the light pipe 420A and toward the chamfered surface 421A around an outer circumference of the rear face.

As shown in FIG. 4C, the graph of simulated illumination of the light pipe 420A may illustrate a view when facing the front face of the light pipe 420A, e.g., when looking down on the light pipe 420A and exit ring 405 from an upper portion of FIG. 4A. Because the four LEDs 441 direct light substantially directly toward and into respective light channels 427A, via which the light is then reflected and propagated by at least curved surfaces 423A to directions at least partially radially outward away from a center of the light pipe 420A and toward the chamfered surface 421A, and further via which the light is then reflected and propagated toward the exit ring 405, portions of the exit ring 405 that are more directly aligned with or proximate the LEDs 441, the light channels 427A, and the curved surfaces 423A that direct and propagate the light may be more highly illuminated, e.g., portions that are slightly offset from approximate centers of opposing straight portions and from approximate centers of opposing curved portions of the elliptical shape may be more highly illuminated. Nonetheless, the light pipe 420A may create or generate slightly more uniform illumination for approximately all portions of the exit ring 405, as compared with the graphs of FIGS. 2B, 2D, 2F, and 3C. Moreover, because four LEDs 441 are used to generate illumination of the exit ring 405, the light pipe 420A may not have associated increased cost and energy consumption as described with respect to the light pipe 220E of FIGS. 2E and 2F. Furthermore, because the LEDs 441 are positioned within an outer periphery and received within portions of the rear face of the light pipe 420A, the light pipe 420A may not have associated increased size and cost as described with respect to the light pipe 320 of FIGS. 3A-3C.

In alternative example embodiments, the light pipe 420A may comprise two, three, four, or other numbers of light channels 427A and corresponding numbers of LEDs 441 associated with the light channels 427A. For example, in examples having two light channels 427A and two LEDs 441, the interfaces between the LEDs 441 and the light channels 427A may be positioned on substantially opposing sides of the body, e.g., on opposing portions of the body, on opposing curved portions of the body, or on opposing straight portions of the body.

FIG. 4D is a schematic side, cross-sectional view diagram 400D of a sixth example light pipe, in accordance with implementations of the present disclosure, FIG. 4E is a schematic rear view diagram 400E of the sixth example light pipe of FIG. 4D, in accordance with implementations of the present disclosure, and FIG. 4F is a graph 400F of simulated illumination for the sixth example light pipe of FIG. 4D, in accordance with implementations of the present disclosure.

As shown in the cross-sectional and rear views of FIGS. 4D and 4E, a sixth example light pipe 420D may comprise a body having an elliptical shape. A front face of the light pipe 420D may be positioned toward an upper portion of FIG. 4D, and a rear face of the light pipe 420D may be positioned toward a lower portion of FIG. 4D, the rear face also being illustrated in the drawing of FIG. 4E.

At the front face of the light pipe 420D, an exit ring 405 may be formed as part of the body. In addition, at a rear face of the light pipe 420D, one or more LEDs 441 may be positioned proximate interfaces or portions of the light pipe 420D that are configured to receive light. The one or more LEDs 441 may be coupled or attached to a printed circuit board assembly, and may be configured to emit light toward and into the light pipe 420D, in order to illuminate the exit ring 405. As illustrated, the LEDs 441 may be positioned substantially within an outer periphery and received within portions of the rear face of the elliptical shape of the light pipe 420D.

Between the front and rear faces of the light pipe 420D, a chamfered surface 421D may be formed continuously around an outer circumference of the rear face. The chamfered surface 421D may reflect and propagate light that is received from the LEDs 441 toward the exit ring 405. For example, the chamfered surface 421D may form an approximate forty-five degree angle with the rear face of the light pipe 420D. In addition, a fillet 422D may be formed continuously around an inner portion of the light pipe 420D that is substantially opposed to the chamfered surface 421D, and the fillet 422D may also cooperate with the chamfered surface 421D to direct and propagate light toward the exit ring 405. For example, the fillet 422D may allow propagation of more or additional light or rays of light via the chamfered surface 421D toward the exit ring 405, as compared to the corner or edge 422A of the light pipe 420A of FIGS. 4A-4C.

In the example of FIGS. 4D-4F, four LEDs 441 may be positioned around the elliptical shape of the body of the light pipe 420D, e.g., first and second LEDs positioned slightly offset from approximate centers of opposing straight portions of the elliptical shape, and third and fourth LEDs positioned slightly offset from approximate centers of opposing curved portions of the elliptical shape. The four LEDs 441 may be approximately equally spaced apart from each other around the elliptical shape of the body.

In addition, each of the four LEDs 441 may be positioned and oriented to emit light in a direction substantially parallel to the front and rear faces of the light pipe 420D, and also circumferentially or elliptically around a center of the light pipe 420D. For example, in the rear view of FIG. 4E, the four LEDs 441 may emit light directly toward or into respective light channels 427D, such that the light is reflected and propagated in an approximately clockwise circumferential or elliptical direction around a center of the light pipe 420D illustrated in FIG. 4E. In addition, the plurality of light channels 427D may be at least partially defined or bounded by curved or arcuate surfaces 423D that facilitate reflection and propagation of light received from the LEDs 441 to one or more directions at least partially radially outward away from a center of the light pipe 420D and toward the chamfered surface 421D around an outer circumference of the rear face. For example, the plurality of light channels 427D may extend a greater distance circumferentially around the center of the light pipe 420D, and the curved surfaces 423D may be positioned circumferentially farther along the respective light channels 427D and away from the interfaces between the LEDs 441 and the light channels 427D, as compared to the light channels 427A and curved surfaces 423A of the light pipe 420A of FIGS. 4A-4C.

As shown in FIG. 4F, the graph of simulated illumination of the light pipe 420D may illustrate a view when facing the front face of the light pipe 420D, e.g., when looking down on the light pipe 420D and exit ring 405 from an upper portion of FIG. 4D. Because the four LEDs 441 direct light substantially directly toward and into respective light channels 427D, via which the light is then reflected and propagated along the extended light channels 427D and by at least curved surfaces 423D to directions at least partially radially outward away from a center of the light pipe 420D and toward the chamfered surface 421D, and further via which the light is then reflected and propagated toward the exit ring 405, portions of the exit ring 405 that are more directly aligned with or proximate the LEDs 441, the light channels 427D, and the curved surfaces 423D that direct and propagate the light may be more highly illuminated, e.g., portions that are slightly offset from approximate centers of opposing straight portions and from approximate centers of opposing curved portions of the elliptical shape may be more highly illuminated. For example, opposing straight portions of the exit ring 405 may be more highly illuminated than sections of the opposing curved portions of the exit ring 405. Nonetheless, the light pipe 420D may create or generate relatively more uniform illumination for approximately all portions of the exit ring 405, as compared with the graphs of FIGS. 2B, 2D, 2F, 3C, and 4C, and may also be relatively brighter than the graph of FIG. 4C. Moreover, because four LEDs 441 are used to generate illumination of the exit ring 405, the light pipe 420D may not have associated increased cost and energy consumption as described with respect to the light pipe 220E of FIGS. 2E and 2F. Furthermore, because the LEDs 441 are positioned within an outer periphery and received within portions of the rear face of the light pipe 420D, the light pipe 420D may not have associated increased size and cost as described with respect to the light pipe 320 of FIGS. 3A-3C.

In alternative example embodiments, the light pipe 420D may comprise two, three, four, or other numbers of light channels 427D and corresponding numbers of LEDs 441 associated with the light channels 427D. For example, in examples having two light channels 427D and two LEDs 441, the interfaces between the LEDs 441 and the light channels 427D may be positioned on substantially opposing sides of the body, e.g., on opposing portions of the body, on opposing curved portions of the body, or on opposing straight portions of the body.

Figures 5A, 5B, 5C:
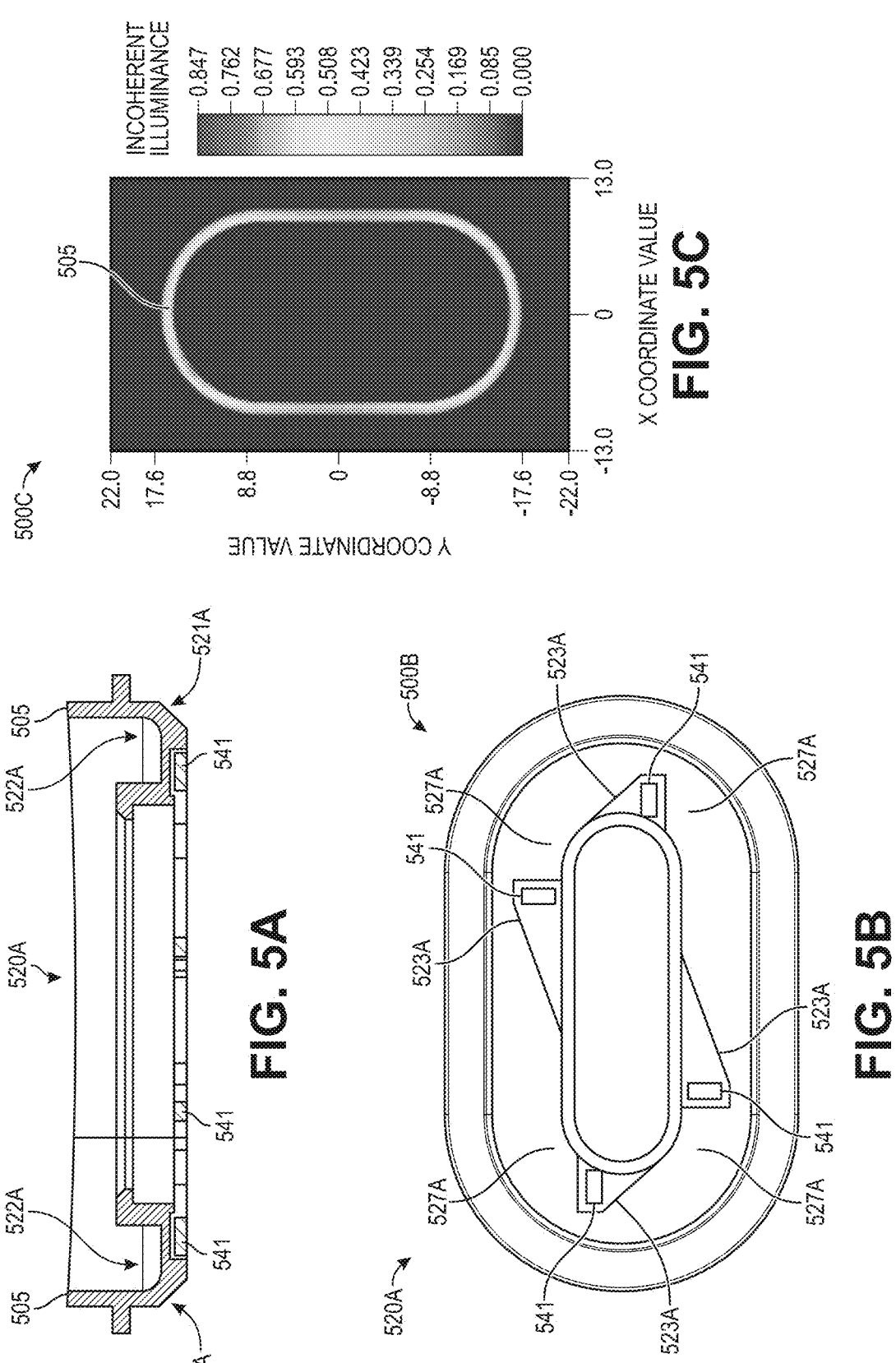
FIG. 5A is a schematic side, cross-sectional view diagram of a seventh example light pipe, in accordance with implementations of the present disclosure.
FIG. 5B is a schematic rear view diagram of the seventh example light pipe of FIG. 5A, in accordance with implementations of the present disclosure.
FIG. 5C is a graph of simulated illumination for the seventh example light pipe of FIG. 5A, in accordance with implementations of the present disclosure.
Figure 5D:
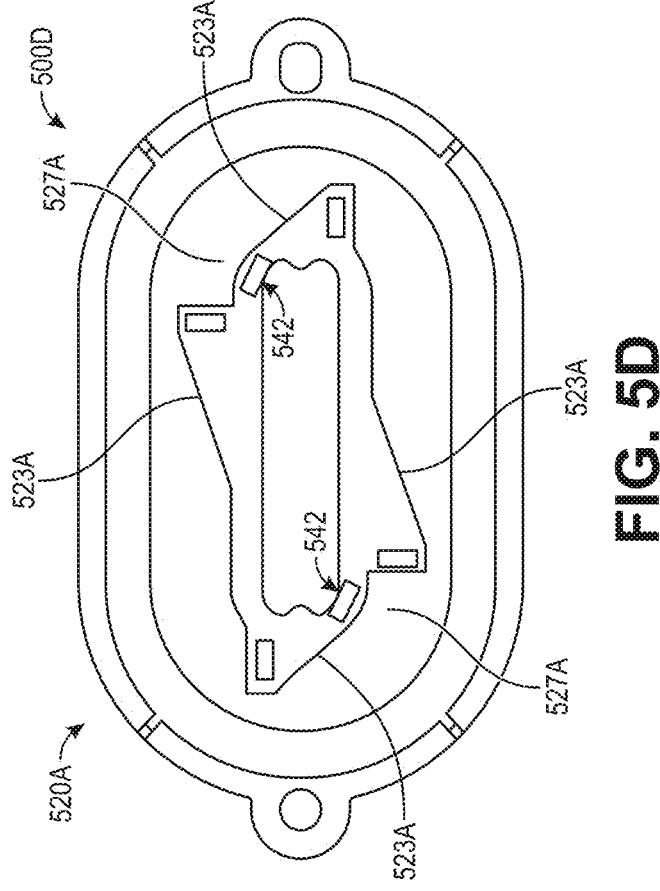
FIG. 5D is a schematic rear view diagram of an example variation of the seventh example light pipe of FIG. 5A, in accordance with implementations of the present disclosure.

FIG. 5A is a schematic side, cross-sectional view diagram 500A of a seventh example light pipe, in accordance with implementations of the present disclosure, FIG. 5B is a schematic rear view diagram 500B of the seventh example light pipe of FIG. 5A, in accordance with implementations of the present disclosure, FIG. 5C is a graph 500C of simulated illumination for the seventh example light pipe of FIG. 5A, in accordance with implementations of the present disclosure, and FIG. 5D is a schematic rear view diagram 500D of an example variation of the seventh example light pipe of FIG. 5A, in accordance with implementations of the present disclosure.

As shown in the cross-sectional and rear views of FIGS. 5A, 5B, and 5D, a seventh example light pipe 520A may comprise a body having an elliptical shape. A front face of the light pipe 520A may be positioned toward an upper portion of FIG. 5A, and a rear face of the light pipe 520A may be positioned toward a lower portion of FIG. 5A, the rear face also being illustrated in the drawings of FIGS. 5B and 5D.

At the front face of the light pipe 520A, an exit ring 505 may be formed as part of the body. In addition, at a rear face of the light pipe 520A, one or more LEDs 541 may be positioned proximate interfaces or portions of the light pipe 520A that are configured to receive light. The one or more LEDs 541 may be coupled or attached to a printed circuit board assembly, and may be configured to emit light toward and into the light pipe 520A, in order to illuminate the exit ring 505. As illustrated, the LEDs 541 may be positioned substantially within an outer periphery and received within portions of the rear face of the elliptical shape of the light pipe 520A.

Between the front and rear faces of the light pipe 520A, an annular, chamfered surface 521A may be formed continuously around an outer circumference of the rear face. The chamfered surface 521A may reflect and propagate light that is received from the LEDs 541 toward the exit ring 505. For example, the chamfered surface 521A may form an approximate forty-five degree angle with the rear face of the light pipe 520A. In addition, an annular fillet 522A may be formed continuously around an inner portion of the light pipe 520A that is substantially opposed to the chamfered surface 521A, and the fillet 522A may also cooperate with the chamfered surface 521A to direct and propagate light toward the exit ring 505. For example, the fillet 522A may allow propagation of more or additional light or rays of light via the chamfered surface 521A toward the exit ring 505, as compared to the corner or edge 422A of the light pipe 420A of FIGS. 4A-4C.

In the example of FIGS. 5A-5D, four LEDs 541 may be positioned around the elliptical shape of the body of the light pipe 520A, e.g., first and second LEDs positioned toward ends of opposing straight portions of the elliptical shape, and third and fourth LEDs positioned toward ends of opposing curved portions of the elliptical shape. The four LEDs 541 may be positioned relatively closer to curved portions on opposing sides or ends of the elliptical shape of the body, e.g., two LEDs positioned closer to a first curved portion, and two other LEDs positioned closer to a second curved portion.

In addition, each of the four LEDs 541 may be positioned and oriented to emit light in a direction substantially parallel to the front and rear faces of the light pipe 520A, and also circumferentially or elliptically around a center of the light pipe 520A. For example, in the rear view of FIGS. 5B and 5D, the four LEDs 541 may emit light directly toward or into respective light channels 527A, such that the light is reflected and propagated in an approximately clockwise circumferential or elliptical direction around a center of the light pipe 520A illustrated in FIGS. 5B and 5D. In addition, the plurality of light channels 527A may be at least partially defined or bounded by straight or planar surfaces 523A that facilitate reflection and propagation of light received from the LEDs 541 to one or more directions at least partially radially outward away from a center of the light pipe 520A and toward the chamfered surface 521A around an outer circumference of the rear face. For example, the plurality of light channels 527A may extend a greater distance circumferentially around the center of the light pipe 520A, and the planar surfaces 523A may be positioned circumferentially farther along the respective light channels 527A and away from the interfaces between the LEDs 541 and the light channels 527A, as compared to the light channels 427A and curved surfaces 423A of the light pipe 420A of FIGS. 4A-4C. In addition, the planar surfaces 523A may facilitate relatively even or consistent reflection of rays of light toward the chamfered surface 521A, thereby generating more uniform illumination of the exit ring 505.

As shown in FIG. 5C, the graph of simulated illumination of the light pipe 520A may illustrate a view when facing the front face of the light pipe 520A, e.g., when looking down on the light pipe 520A and exit ring 505 from an upper portion of FIG. 5A. Because the four LEDs 541 direct light substantially directly toward and into respective light channels 527A, via which the light is then reflected and propagated along the extended light channels 527A and by at least planar surfaces 523A to directions at least partially radially outward away from a center of the light pipe 520A and toward the chamfered surface 521A, and further via which the light is then reflected and propagated toward the exit ring 505, portions of the exit ring 505 that are more directly aligned with or proximate the LEDs 541, the light channels 527A, and the planar surfaces 523A that direct and propagate the light may be more highly illuminated, e.g., curved portions on opposing sides or ends of the elliptical shape of the body may be slightly more highly illuminated. For example, curved portions on opposing sides or ends of the exit ring 505 of the elliptical shape of the body may be substantially uniformly illuminated, and straight portions on opposing sides of the exit ring 505 of the elliptical shape of the body may also be more uniformly illuminated. As a result, the light pipe 520A may create or generate substantially uniform illumination for approximately all portions of the exit ring 505, as compared with other example light pipes and graphs of simulated illumination described herein. Moreover, because four LEDs 541 are used to generate illumination of the exit ring 505, the light pipe 520A may not have associated increased cost and energy consumption as described with respect to the light pipe 220E of FIGS. 2E and 2F. Furthermore, because the LEDs 541 are positioned within an outer periphery and received within portions of the rear face of the light pipe 520A, the light pipe 520A may not have associated increased size and cost as described with respect to the light pipe 320 of FIGS. 3A-3C.

In alternative example embodiments, the light pipe 520A may comprise two, three, four, or other numbers of light channels 527A and corresponding numbers of LEDs 541 associated with the light channels 527A. For example, in examples having two light channels 527A and two LEDs 541, the interfaces between the LEDs 541 and the light channels 527A may be positioned on substantially opposing sides of the body, e.g., on opposing portions of the body, on opposing curved portions of the body, or on opposing straight portions of the body.

As shown in FIG. 5D, an example variation of the seventh example light pipe 520A may comprise substantially identical features as those described herein with respect to FIGS. 5A-5C. In addition, the example variation of the light pipe 520A of FIG. 5D may further comprise one or more additional LEDs 542, which may also be coupled or attached to a printed circuit board assembly similar to the LEDs 541. The additional LEDs 542 may comprise various colored LEDs, such as red, yellow, green, blue, pink, purple, or other colors that may be different from the same or single color of the LEDs 541. For example, the additional LEDs may be used as various additional status indicators, e.g., related to powering on or off, establishing communication connections, poor network connectivity or status, low power, and/or other states or errors that may be associated with an electronic device that includes the light pipe 520A and associated assembly.

The additional LEDs 542 may be positioned at various locations within the elliptical shape of the body of the light pipe 520A. In the example illustrated in FIG. 5D, the additional LEDs 542 may be positioned toward corners of the elliptical shape, within the outer periphery of the light pipe 520A, and within portions of a rear face of the light pipe 520A. Because uniform illumination of the exit ring 505 may not be a primary focus or aim for the light emitted by the additional LEDs 542, the additional LEDs 542 may be positioned or oriented to direct light generally radially outward away from a center of the light pipe 520A. For example, the light emitted from the additional LEDs 542 may reflect or propagate within portions of one or more light channels 527A toward the chamfered surface 521A, via which the light may then be reflected or propagated toward the exit ring 505. In this manner, only specific portions or sections of the exit ring 505 may be illuminated by individual additional LEDs 542, thereby facilitating communication of various states, errors, or other information using such illumination by the additional LEDs 542.

Figure 6A:
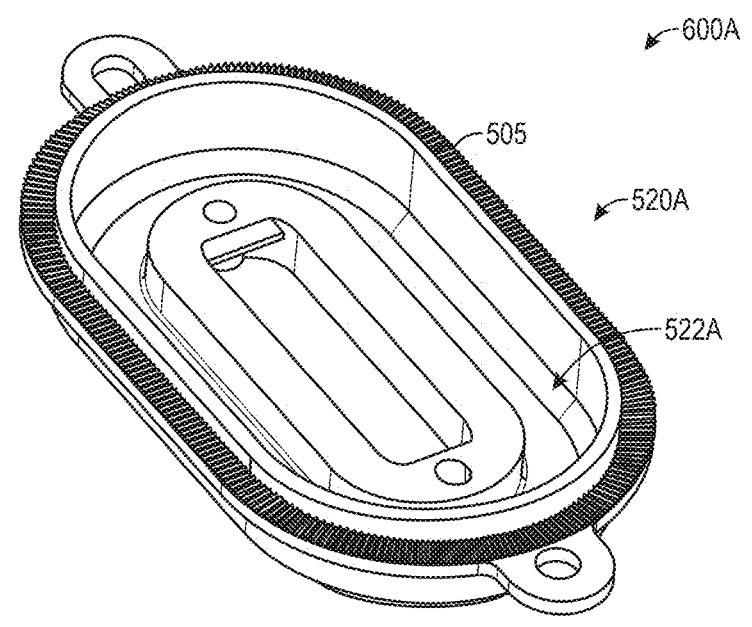
FIG. 6A is a schematic front perspective view diagram of the seventh example light pipe of FIGS. 5A-5D, in accordance with implementations of the present disclosure.
Figure 6B:
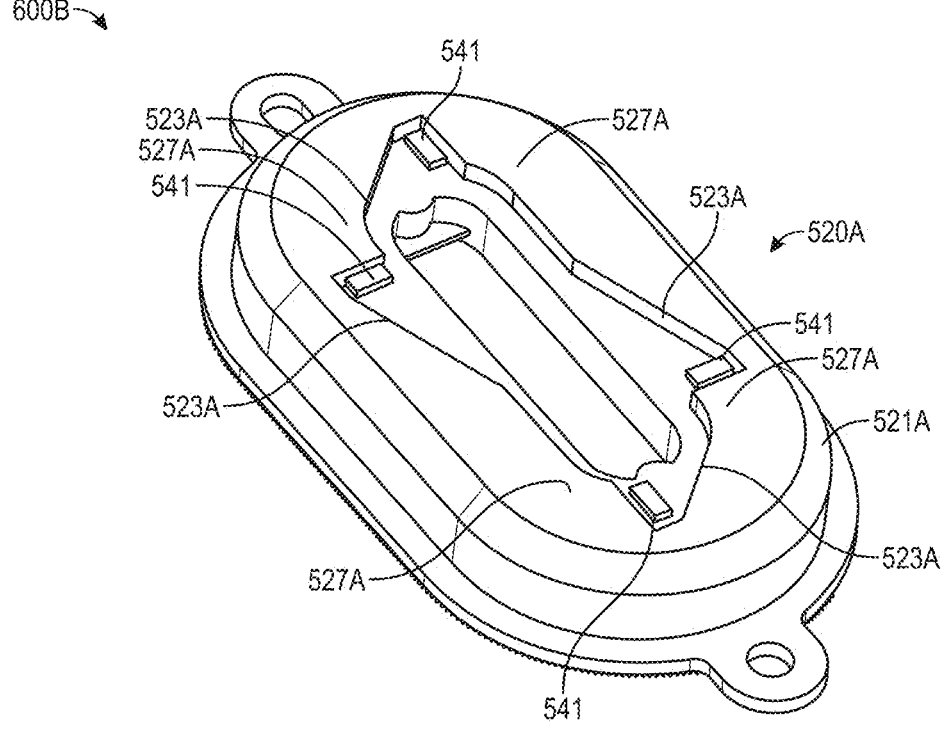
FIG. 6B is a schematic rear perspective view diagram of the seventh example light pipe of FIGS. 5A-5D, in accordance with implementations of the present disclosure.

FIG. 6A is a schematic front perspective view diagram 600A of the seventh example light pipe of FIGS. 5A-5D, in accordance with implementations of the present disclosure, and FIG. 6B is a schematic rear perspective view diagram 600B of the seventh example light pipe of FIGS. 5A-5D, in accordance with implementations of the present disclosure.

As shown in FIGS. 6A and 6B, the light pipe 520A may include substantially all the features as described herein with respect to FIGS. 5A-5D. In the front perspective view of FIG. 6A, the front face of the light pipe 520A may include the exit ring 505 having an elliptical shape that is to be illuminated by the LEDs 541 via various features of the light pipe 520A described herein. In addition, in an interior portion of the front face of the light pipe 520A, the annular fillet 522A may be formed continuously around the inner portion and may be substantially opposed to the annular, chamfered surface 521A that extends around an outer circumference of the rear face of the light pipe 520A.

In the rear perspective view of FIG. 6B, the four LEDs 541 that are coupled or attached to a printed circuit board assembly may be positioned within an outer periphery of, and within portions of, the rear face of the light pipe 520A. The four LEDs 541 may direct or emit light into a plurality of light channels 527A and at least partially circumferentially or elliptically around the light pipe 520A. In addition, the plurality of light channels 527A may be bounded by one or more planar surfaces 523A to direct, reflect, or propagate the light toward the outer circumference of the rear face. Around the outer circumference, an annular, chamfered surface 521A may be formed continuously around the rear face of the light pipe 520A, and the chamfered surface 521A may reflect or propagate light, potentially in combination with the annular fillet 522A, toward the exit ring 505 of the front face.

Based at least in part on the number, positions, and orientations of the LEDs 541 and associated interfaces to the light pipe 520A, the number, positions, orientations, and dimensions of the plurality of light channels 527A, the number, positions, orientations, and dimensions of the planar surfaces 523A, the positions, orientations, and dimensions of the chamfered surface 521A and fillet 522A, and/or the positions, orientations, and dimensions of the exit ring 505, the light pipe 520A may generate substantially uniform illumination of all portions of the exit ring 505. In addition, the light pipe 520A may comprise a compact, space-saving design that can be used in various electronic devices. Further, the light pipe 520A may be cost- and energy-efficient by using only four LEDs to generate substantially uniform illumination.

Figures 7A, 7B:
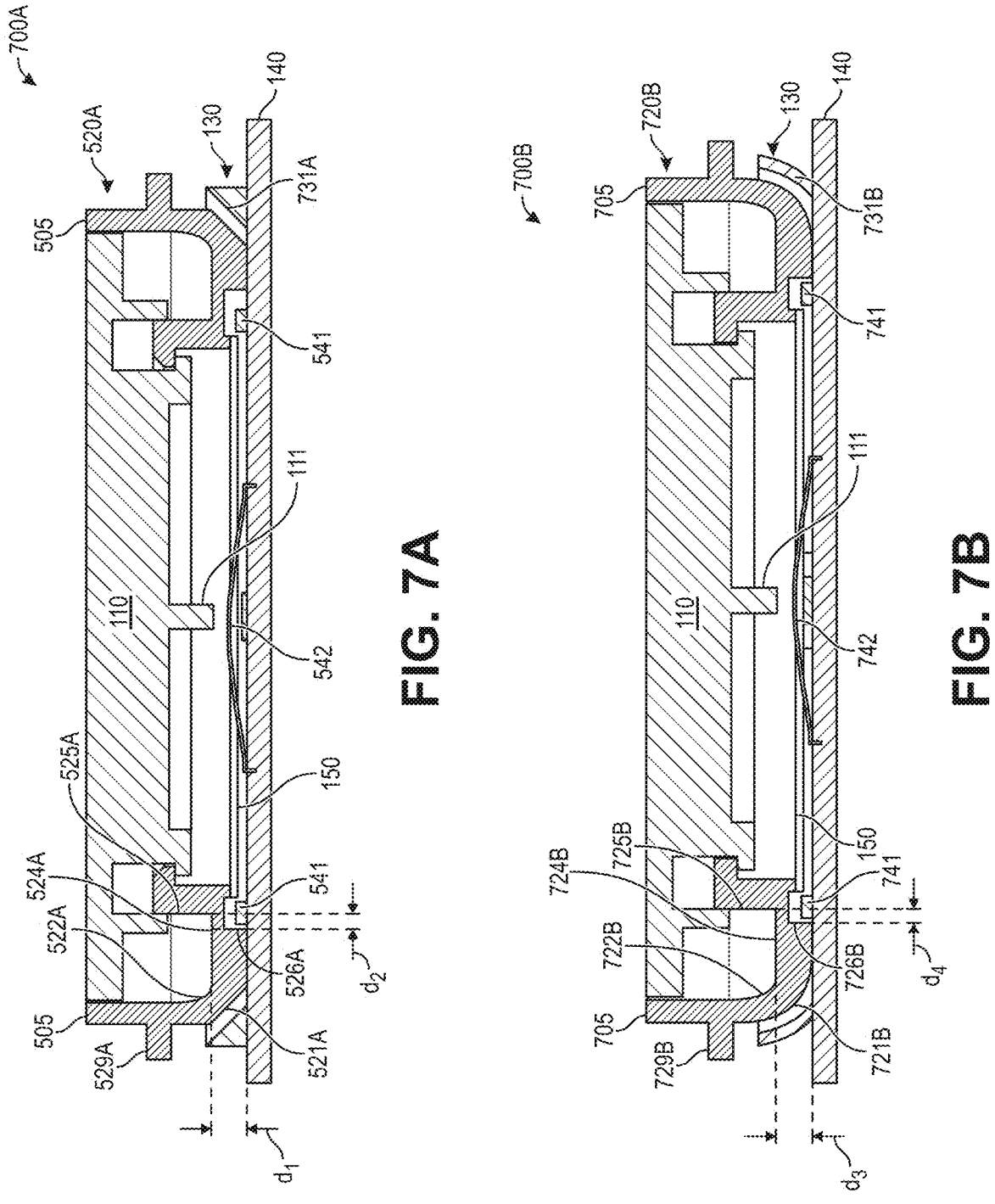
FIG. 7A is a schematic side, cross-sectional view diagram of a light pipe assembly including the seventh example light pipe of FIGS. 5A-5D, 6A, and 6B, in accordance with implementations of the present disclosure.
FIG. 7B is a schematic side, cross-sectional view diagram of a light pipe assembly including an eighth example light pipe similar to the seventh example light pipe of FIGS. 5A-5D, 6A, and 6B, in accordance with implementations of the present disclosure.

FIG. 7A is a schematic side, cross-sectional view diagram 700A of a light pipe assembly including the seventh example light pipe of FIGS. 5A-5D, 6A, and 6B, in accordance with implementations of the present disclosure.

As shown in FIG. 7A, the light pipe assembly may comprise a button 110, a light pipe 520A, a reflector 130, a printed circuit board assembly (PCBA) 140, and a protective filter 150. The light pipe 520A may include substantially all the features as described herein with respect to FIGS. 5A-5D and 6A-6B, including at least the exit ring 505, the chamfered surface 521A, the fillet 522A, and the plurality of light channels and planar surfaces (not labeled).

The button 110 may comprise an elliptical shape, and may be inserted or attached to an interior portion of the light pipe 520A via one or more hooks, clips, snaps, flanges, or other engagement features. In addition, the button 110 may be inserted within a periphery of the exit ring 505, such that an outer surface of the button 110 when fully installed may be substantially flush with the exit ring 505. Further, an inner portion 111 of the button 110 may extend toward and be configured to contact or actuate a switch 542 associated with the printed circuit board assembly 140. The button 110 may be formed of plastics, metals, or other materials.

The reflector 130 may comprise an elliptical shape, and may be positioned around an outer circumference of the rear face of the light pipe 520A. In addition, the reflector 130 may have an annular, mating surface 731A that substantially mates with or corresponds to the annular, chamfered surface 521A of the light pipe 520A, and the annular, mating surface 731A may facilitate reflection or propagation of light within the light pipe 520A. The annular, mating surface 731A of the reflector 130, when fully inserted or installed, may contact the chamfered surface 521A, or may be positioned with a small air gap relative to the chamfered surface 521A, of the light pipe 520A. The reflector 130 may be formed of plastics, metals, or other materials.

The PCBA 140 may comprise a circuit board with various processors, memories, light emitting diodes 541, switches 542, connectors, or other electronic components. For example, the LEDs 541 and switch 542 may be coupled or attached to the PCBA 140, and may be operatively connected to various batteries, communication devices, and/or other electronic components via the PCBA 140. The PCBA 140 may be inserted or installed to the rear face of the light pipe 520A, and when fully inserted or installed, the LEDs 541 may be positioned proximate respective interfaces to the plurality of light channels, and the switch 542 may be positioned proximate an inner portion 111 of the button 110. The PCBA 140 may be formed of various materials that are conventionally used for circuit boards and associated assemblies.

The protective filter 150 may comprise a thin film, sheet, or other shielding material that may be installed, coupled, or adhered to a central portion of the rear face of the light pipe 520A. The protective filter 150 may prevent ingress of dust, moisture, or other particulates from an environment proximate a front portion of the light pipe assembly into an interior of the light pipe assembly, e.g., proximate the PCBA 140, including the LEDs 541, switches 542, or other electronic components. In addition, the protective filter 150 may be flexible or compliant, e.g., to enable actuation of the switch 542 by the inner portion 111 of the button 110 via flexure, bending, or elastic deformation of at least a portion of the protective filter 150.

As further illustrated in FIG. 7A, one or more dimensions, features, attributes, and/or combinations thereof of portions of the light pipe 520A may affect the direction, reflection, and propagation of light from the LEDs 541 and through the light pipe 520A to provide uniform illumination of the exit ring 505.

For example, the position and angle of the chamfered surface 521A relative to the interface with the LEDs 541 may affect the reflection and propagation of light to the exit ring 505. In some examples, the angle of the chamfered surface 521A may be approximately forty-five degrees. In addition, the position of the chamfered surface 521A may be selected or configured to receive light from the LEDs 541 and to reflect and propagate substantially all received light toward the exit ring 505.

In addition, a thickness $d_1$ of the material of the light pipe 520A between the surface 524A and the rear face of the light pipe 520A may also affect the reflection and propagation of light to the exit ring 505. For example, the thickness $d_1$ may correspond substantially to the thickness of the plurality of light channels. In some examples, the thickness $d_1$ may be selected or optimized to reduce or minimize scattering or spurious reflections or refractions of rays of light within the material between the interface with the LEDs 541 and the chamfered surface 521A. In additional examples, the thickness $d_1$ may be selected or optimized to enable or maximize propagation of rays of light within the material from the interface with the LEDs 541 toward the chamfered surface 521A.

Further, an offset $d_2$ between a flange surface 525A and an interface surface 526A of the LEDs 541 may affect the reflection and propagation of light to the exit ring 505. For example, the offset $d_2$ may correspond to an amount or distance by which the flange surface 525A is positioned inboard or radially inward of the interface surface 526A. The flange surface 525A may be associated with a button flange that is used to couple or engage the button 110 with the light pipe 520A. In some examples, the offset $d_2$ may be selected or optimized to reduce or minimize scattering or spurious reflections or refractions of rays of light into portions of the button flange from the interface with the LEDs 541, instead of such light being directed and propagated toward the chamfered surface 521A. If the offset $d_2$ has a negative value, e.g., the flange surface 525A is positioned outboard or radially outward of the interface surface 526A, such that there is an overlap between the button flange that is used to couple or engage the button 110 with the light pipe 520A and the interface surface 526A at which light is received from the LEDs 541, more or additional light may be reflected or refracted into the button flange from the interface with the LEDs 541, instead of such light being directed and propagated toward the chamfered surface 521A.

In addition, a position of the interface surface 526A relative to the LEDs 541 may affect the reflection and propagation of light to the exit ring 505. For example, if there is a relatively larger air gap between the interface surface 526A and the LEDs 541, relatively more light from the LEDs 541 may be reflected or refracted away from the light pipe 520A, instead of such light being received and propagated through the light pipe 520A. In contrast, if there is a relatively smaller or no air gap between the interface surface 526A and the LEDs 541, relatively more or substantially all light from the LEDs 541 may be received and propagated through the light pipe 520A.

Moreover, the positions, dimensions, and angles of the planar surfaces 523A associated with the plurality of light channels 527A may also affect the reflection and propagation of light to the exit ring 505. For example, if the positions of the planar surfaces 523A are circumferentially closer to the LEDs 541 from which such planar surfaces 523A receive light for reflection and propagation, portions of the exit ring 505 that may be circumferentially further from the LEDs 541 may not be sufficiently or uniformly illuminated with other portions of the exit ring 505. In addition, if the dimensions and/or angles of the planar surfaces 523A are changed or modified, such changes may also affect the reflection and propagation of light to various portions of the exit ring 505.

Various other dimensions, features, attributes, and/or combinations thereof of portions of the light pipe 520A may further affect the direction, reflection, and propagation of light from the LEDs 541 and through the light pipe 520A to provide uniform illumination of the exit ring 505.

Generally, thicknesses of various portions of the light pipe 520A may be selected or optimized to reduce or minimize scattering or spurious reflections or refractions of rays of light within the material, as well as to enable or maximize propagation of rays of light within the material toward the exit ring 505. In addition, overlaps or intersections with assembly flanges 529A, button flanges, or other portions of the light pipe 520A may be reduced or minimized to avoid or reduce scattering or spurious reflections or refractions of rays of light into portions of such flanges or portions, instead of such light being directed and propagated toward the exit ring 505.

In further example embodiments, substantially all surfaces of the light pipe 520A may be formed, processed, or finished to have a high gloss finish. In addition, substantially all surfaces of the light pipe 520A may also be painted white. For example, the white, high gloss finish of substantially all surfaces of the light pipe 520A may facilitate reflection and propagation of light within the light pipe 520A, and minimize propagation of light out of and away from the light pipe 520A, which may increase overall brightness of illumination of the exit ring 505. In some examples, however, the outer surface of the exit ring 505 may have a different surface finish or texture, e.g., a mild sandpaper-like texture, which may help diffuse the light that has reflected and propagated to the exit ring 505 and thereby uniformly illuminate the exit ring 505.

FIG. 7B is a schematic side, cross-sectional view diagram 700B of a light pipe assembly including an eighth example light pipe similar to the seventh example light pipe of FIGS. 5A-5D, 6A, and 6B, in accordance with implementations of the present disclosure.

As shown in FIG. 7B, the light pipe assembly may comprise a button 110, a light pipe 720B, a reflector 130, a printed circuit board assembly (PCBA) 140, and a protective filter 150. The light pipe 720B may include substantially all the features as described herein with respect to the light pipe 520A of FIGS. 5A-5D, 6A-6B, and 7A, including at least the exit ring 705, the fillet 722B, and the plurality of light channels and planar surfaces (not labeled). In contrast to the annular, chamfered surface 521A of the light pipe 520A, the light pipe 720B may comprise an annular, curved surface 721B around an outer circumference of the rear face that reflects or propagates light toward the exit ring 705.

In addition, the light pipe assembly may comprise substantially all the features as described herein with respect to the light pipe assembly of at least FIG. 7A, including the button 110, the reflector 130, the PCBA 140 having LEDs 741 and switches 742, and the protective filter 150. In addition, the reflector 130 may comprise an elliptical shape, and may be positioned around an outer circumference of the rear face of the light pipe 720B. In contrast to the light pipe assembly of FIG. 7A, the reflector 130 in the example of FIG. 7B may have an annular, mating surface 731B that substantially mates with or corresponds to the annular, curved surface 721B of the light pipe 720B, and the annular, mating surface 731B may facilitate reflection or propagation of light within the light pipe 720B. The annular, mating surface 731B of the reflector 130, when fully inserted or installed, may contact the curved surface 721B, or may be positioned with a small air gap relative to the curved surface 721B, of the light pipe 720B.

As further illustrated in FIG. 7B, one or more dimensions, features, attributes, and/or combinations thereof of portions of the light pipe 720B may affect the direction, reflection, and propagation of light from the LEDs 741 and through the light pipe 720B to provide uniform illumination of the exit ring 705.

For example, the position and curvature of the curved surface 721B relative to the interface with the LEDs 741 may affect the reflection and propagation of light to the exit ring 705. In some examples, the curvature of the curved surface 721B may be selected to facilitate bending or reflection of rays of light toward the exit ring 705. In addition, the position of the curved surface 721B may be selected or configured to receive light from the LEDs 741 and to reflect and propagate substantially all received light toward the exit ring 705.

In addition, a thickness $d_3$ of the material of the light pipe 720B between the surface 724B and the rear face of the light pipe 720B may also affect the reflection and propagation of light to the exit ring 705. For example, the thickness $d_3$ may correspond substantially to the thickness of the plurality of light channels. In some examples, the thickness $d_3$ may be selected or optimized to reduce or minimize scattering or spurious reflections or refractions of rays of light within the material between the interface with the LEDs 741 and the curved surface 721B. In additional examples, the thickness $d_3$ may be selected or optimized to enable or maximize propagation of rays of light within the material from the interface with the LEDs 741 toward the curved surface 721B.

Further, an offset de between a flange surface 725B and an interface surface 726B of the LEDs 741 may affect the reflection and propagation of light to the exit ring 705. For example, the offset $d_4$ may correspond to an amount or distance by which the flange surface 725B is positioned inboard or radially inward of the interface surface 726B. The flange surface 725B may be associated with a button flange that is used to couple or engage the button 110 with the light pipe 720B. In some examples, the offset $d_4$ may be selected or optimized to reduce or minimize scattering or spurious reflections or refractions of rays of light into portions of the button flange from the interface with the LEDs 741, instead of such light being directed and propagated toward the curved surface 721B. If the offset $d_4$ has a negative value, e.g., the flange surface 725B is positioned outboard or radially outward of the interface surface 726B, such that there is an overlap between the button flange that is used to couple or engage the button 110 with the light pipe 720B and the interface surface 726B at which light is received from the LEDs 741, more or additional light may be reflected or refracted into the button flange from the interface with the LEDs 741, instead of such light being directed and propagated toward the curved surface 721B.

In addition, a position of the interface surface 726B relative to the LEDs 741 may affect the reflection and propagation of light to the exit ring 705. For example, if there is a relatively larger air gap between the interface surface 726B and the LEDs 741, relatively more light from the LEDs 741 may be reflected or refracted away from the light pipe 720B, instead of such light being received and propagated through the light pipe 720B. In contrast, if there is a relatively smaller or no air gap between the interface surface 726B and the LEDs 741, relatively more or substantially all light from the LEDs 741 may be received and propagated through the light pipe 720B.

Moreover, the positions, dimensions, and angles of the planar surfaces associated with the plurality of light channels of the light pipe 720B may also affect the reflection and propagation of light to the exit ring 705. For example, if the positions of the planar surfaces are circumferentially closer to the LEDs 741 from which such planar surfaces receive light for reflection and propagation, portions of the exit ring 705 that may be circumferentially further from the LEDs 741 may not be sufficiently or uniformly illuminated with other portions of the exit ring 705. In addition, if the dimensions and/or angles of the planar surfaces are changed or modified, such changes may also affect the reflection and propagation of light to various portions of the exit ring 705.

Various other dimensions, features, attributes, and/or combinations thereof of portions of the light pipe 720B may further affect the direction, reflection, and propagation of light from the LEDs 741 and through the light pipe 720B to provide uniform illumination of the exit ring 705.

Generally, thicknesses of various portions of the light pipe 720B may be selected or optimized to reduce or minimize scattering or spurious reflections or refractions of rays of light within the material, as well as to enable or maximize propagation of rays of light within the material toward the exit ring 705. In addition, overlaps or intersections with assembly flanges 729B, button flanges, or other portions of the light pipe 720B may be reduced or minimized to avoid or reduce scattering or spurious reflections or refractions of rays of light into portions of such flanges or portions, instead of such light being directed and propagated toward the exit ring 705.

In further example embodiments, substantially all surfaces of the light pipe 720B may be formed, processed, or finished to have a high gloss finish. In addition, substantially all surfaces of the light pipe 720B may also be painted white. For example, the white, high gloss finish of substantially all surfaces of the light pipe 720B may facilitate reflection and propagation of light within the light pipe 720B, and minimize propagation of light out of and away from the light pipe 720B, which may increase overall brightness of illumination of the exit ring 705. In some examples, however, the outer surface of the exit ring 705 may have a different surface finish or texture, e.g., a mild sandpaper-like texture, which may help diffuse the light that has reflected and propagated to the exit ring 705 and thereby uniformly illuminate the exit ring 705.

Figure 8A:
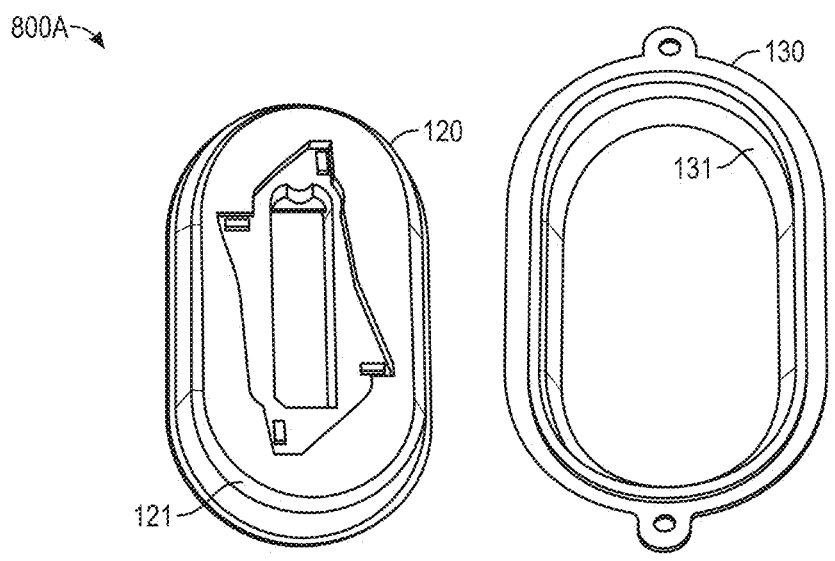
FIG. 8A are schematic rear and front perspective view diagrams of an example light pipe and reflector, respectively, of a light pipe assembly, in accordance with implementations of the present disclosure.

FIG. 8A are schematic rear and front perspective view diagrams 800A of an example light pipe and reflector, respectively, of a light pipe assembly, in accordance with implementations of the present disclosure.

As shown in FIG. 8A, a light pipe 120 may include any and all of the features described herein with respect to the example light pipe 520A. For example, a rear face of the light pipe 120, as illustrated in the left side of FIG. 8A, may comprise a chamfered or curved surface 121 that extends around an outer circumference of the rear face, e.g., an annular chamfered surface, or an annular curved surface.

Further, a front side or portion of the reflector 130, as illustrated in the right side of FIG. 8A, may also comprise a mating or corresponding chamfered or curved surface 131 that extends around an inner circumference of the front side, e.g., a mating, annular chamfered surface, or a mating, annular curved surface. When the rear face of the light pipe 120 is inserted or installed into the front side of the reflector 130, the mating or corresponding chamfered or curved surfaces 121, 131 of the light pipe 120 and reflector 130 may contact each other, or may be substantially aligned with each other with a small air gap therebetween.

In additional example embodiments, substantially all surfaces of the reflector 130, e.g., at least the mating, annular chamfered or curved surfaces 131, may be formed, processed, or finished to have a high gloss finish. In addition, substantially all surfaces of the reflector 130, e.g., at least the mating, annular chamfered or curved surfaces 131, may also be formed of white material or painted white. For example, the white, high gloss finish of one or more surfaces of the reflector 130 may facilitate reflection and propagation of light within the light pipe 120, and minimize propagation of light out of and away from the light pipe 120, which may increase overall brightness of illumination of an exit ring of the light pipe 120.

Figure 8B:
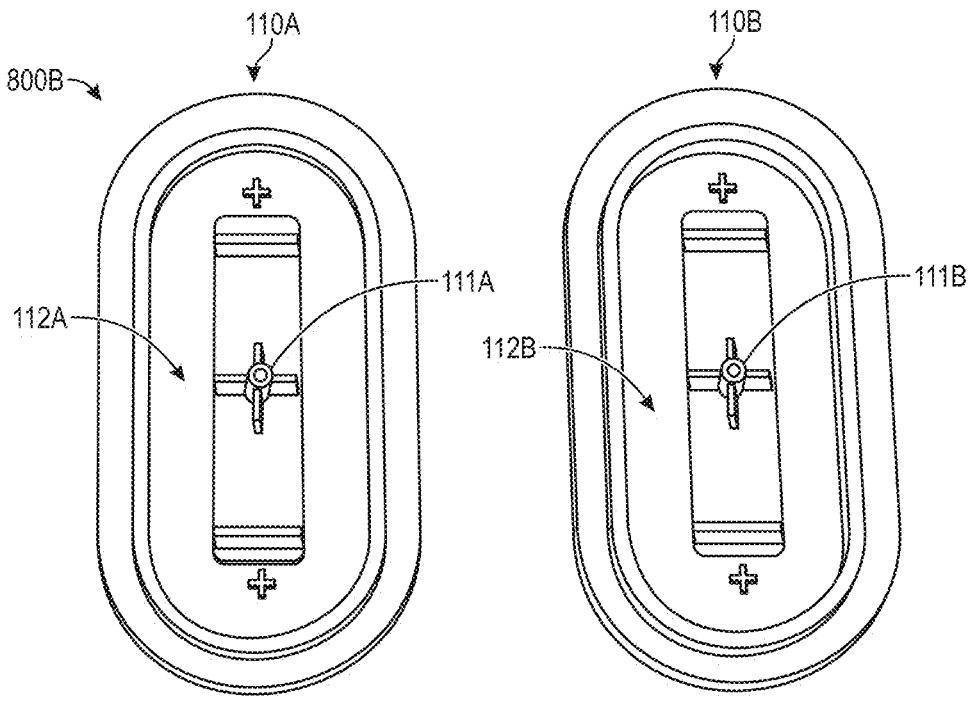
FIG. 8B are schematic rear perspective view diagrams of example white and black buttons of a light pipe assembly, in accordance with implementations of the present disclosure.
Figure 8C:
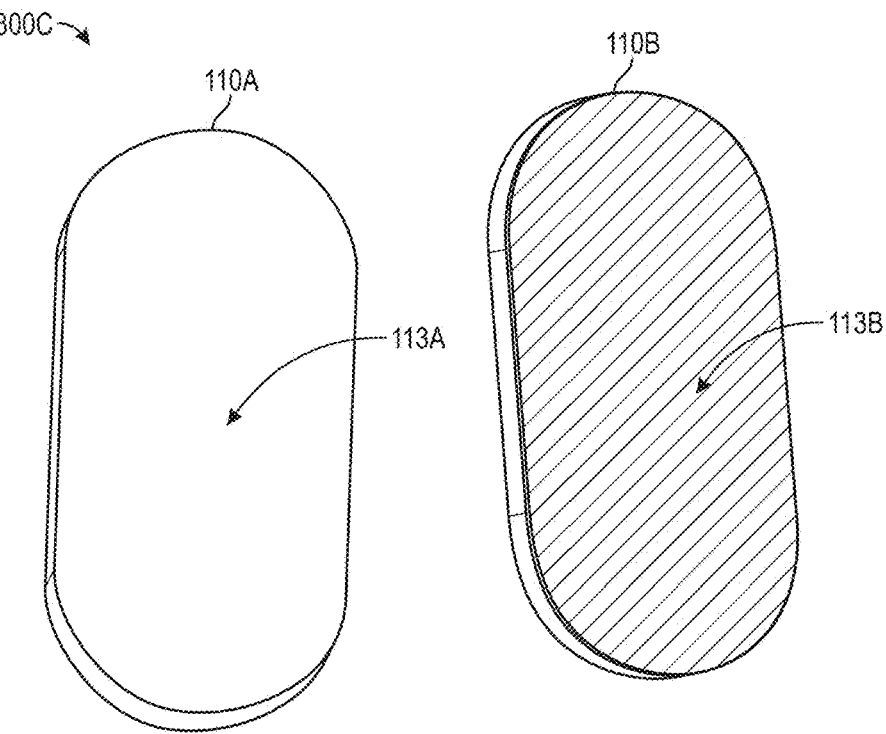
FIG. 8C are schematic front perspective view diagrams of the example white and black buttons of a light pipe assembly, in accordance with implementations of the present disclosure.
Figure 8D:
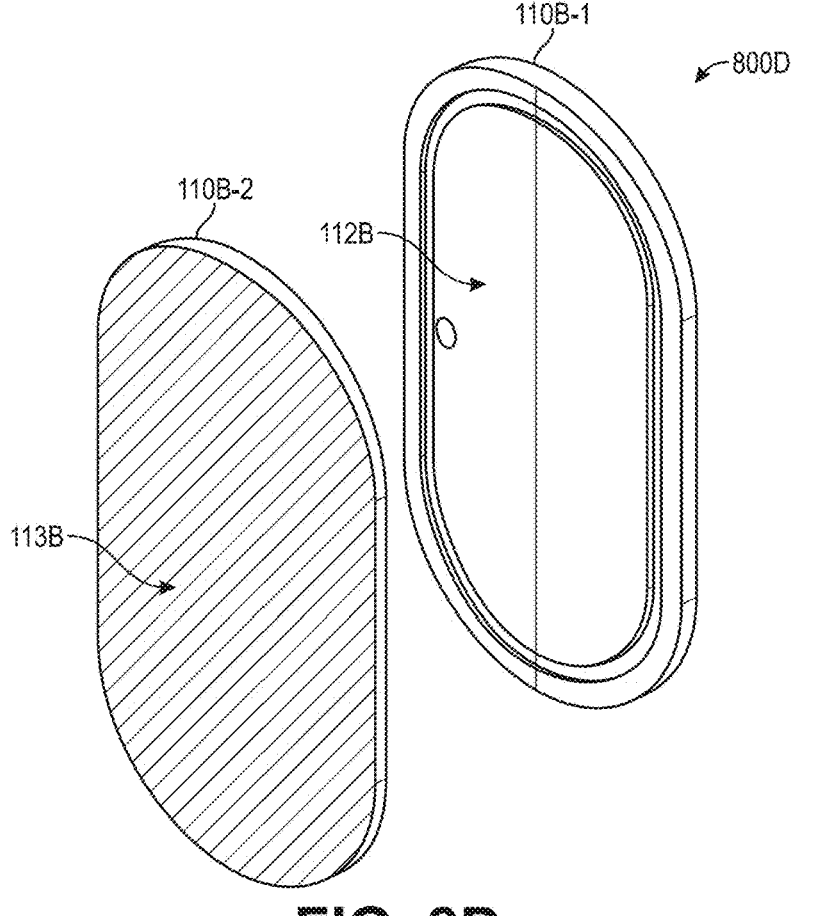
FIG. 8D is a schematic front perspective view diagram of portions of the example black button of a light pipe assembly, in accordance with implementations of the present disclosure.

FIG. 8B are schematic rear perspective view diagrams 800B of example white and black buttons of a light pipe assembly, in accordance with implementations of the present disclosure, FIG. 8C are schematic front perspective view diagrams 800C of the example white and black buttons of a light pipe assembly, in accordance with implementations of the present disclosure, and FIG. 8D is a schematic front perspective view diagram 800D of portions of the example black button of a light pipe assembly, in accordance with implementations of the present disclosure.

As shown in FIGS. 8B-8D, a white or light-colored button 110A and a black or dark-colored button 110B may include any and all of the features described herein with respect to the button 110. For example, inner surfaces of the buttons 110A, 110B, as illustrated in FIG. 8B, may comprise inner portions 111A, 111B that are configured to actuate switches when the buttons 110A, 110B are depressed, pushed, or actuated, e.g., by a user of an electronic device.

In addition, substantially all or entire inner surfaces 112A, 112B of the buttons 110A, 110B may be formed, processed, or finished to have a high gloss finish. In addition, substantially all or entire inner surfaces 112A, 112B of the buttons 110A, 110B may also be formed of white material or painted white. For example, the white, high gloss finish of inner surfaces 112A, 112B of the buttons 110A, 110B may facilitate reflection and propagation of light within the light pipe 120, and minimize propagation of light out of and away from the light pipe 120, which may increase overall brightness of illumination of an exit ring of the light pipe 120.

Further, as illustrated in FIG. 8C, outer surfaces 113A, 113B of the buttons 110A, 110B may have different colors. For example, the white or light-colored button 110A may have an outer surface 113A that is also white or light-colored. In contrast, the black or dark-colored button 110B may have an outer surface 113B that is also black or dark-colored, as indicated by the hashing at the right side of FIG. 8C. In example embodiments, the outer surfaces 113A, 113B of the buttons 110A, 110B may have various colors that are designed or selected to match other exterior portions of an electronic device to which the buttons 110A, 110B are inserted or assembled.

As shown in FIG. 8D, in order to form, mold, or create the black or dark-colored button 110B having an inner surface 112B with a white, high gloss finish and an outer surface 113B with a black, dark, or other color that matches an exterior of an electronic device, the button 110B may be formed of two parts or components, e.g., an inner part 110B-1 and an outer part 110B-2. For example, the inner part 110B-1 may be formed of a material having a white color, and the inner part 110B-1 may also be processed or finished to have a white, high gloss finish. In addition, the outer part 110B-2 may be formed of a material having a black, dark, or other color that matches an exterior of an electronic device, as indicated by the hashing at the left side of FIG. 8D.

In some examples, the button 110B having inner and outer parts 110B-1, 110B-2 may be formed using double shot molding or similar forming processes. In other examples, the inner and outer parts 110B-1, 110B-2 may be formed separately using molding or other forming processes, and then may be coupled, attached, or adhered together to form the button 110B. By maintaining a white, high gloss finish for an inner surface 112B of a button 110B irrespective of a color or finish of an outer surface 113B, reflection and propagation of light within the light pipe 120 may be facilitated to increase overall brightness of illumination of an exit ring of the light pipe 120.

Figure 8E:
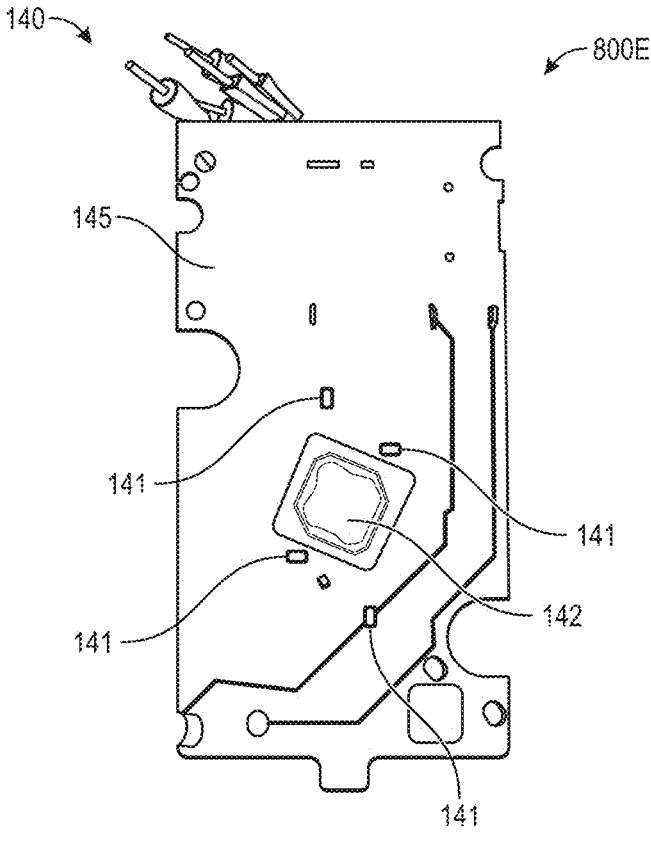
FIG. 8E is a schematic front view diagram of an example printed circuit board assembly of a light pipe assembly, in accordance with implementations of the present disclosure.

FIG. 8E is a schematic front view diagram 800E of an example printed circuit board assembly of a light pipe assembly, in accordance with implementations of the present disclosure.

As shown in FIG. 8E, a PCBA 140 may include any and all of the features described herein with respect to printed circuit board assemblies. For example, the PCBA 140 may comprise a plurality of LEDs 141, e.g., four LEDs, a switch 142, processors, memories, connectors, and other electronic components.

Further, a front side or portion of the PCBA 140, as illustrated in FIG. 8E, may also comprise a PCBA surface 145 that faces or mates with a rear face of the light pipe 120 and/or a rear side of the reflector 130. When the PCBA 140 and PCBA surface 145 are installed or assembled to the light pipe 120 and reflector 130, the LEDs 141 may be aligned with and positioned proximate respective interfaces to a plurality of light channels of the light pipe 120, in order to emit light toward and into the light pipe 120. In addition, the switch 142 may also be aligned with and positioned proximate an inner portion 111 of the button 110 for actuation by depression or pushing of the button 110.

In additional example embodiments, the PCBA surface 145 of the PCBA 140, e.g., at least portions proximate the light pipe 120 and reflector 130, may be formed, processed, or finished to have a high gloss finish. In addition, the PCBA surface 145 of the PCBA 140, e.g., at least portions proximate the light pipe 120 and reflector 130, may also be formed of white material or painted white. For example, the white, high gloss finish of the PCBA surface 145 may facilitate reflection and propagation of light within the light pipe 120, and minimize propagation of light out of and away from the light pipe 120, which may increase overall brightness of illumination of an exit ring of the light pipe 120.

Figure 9A:
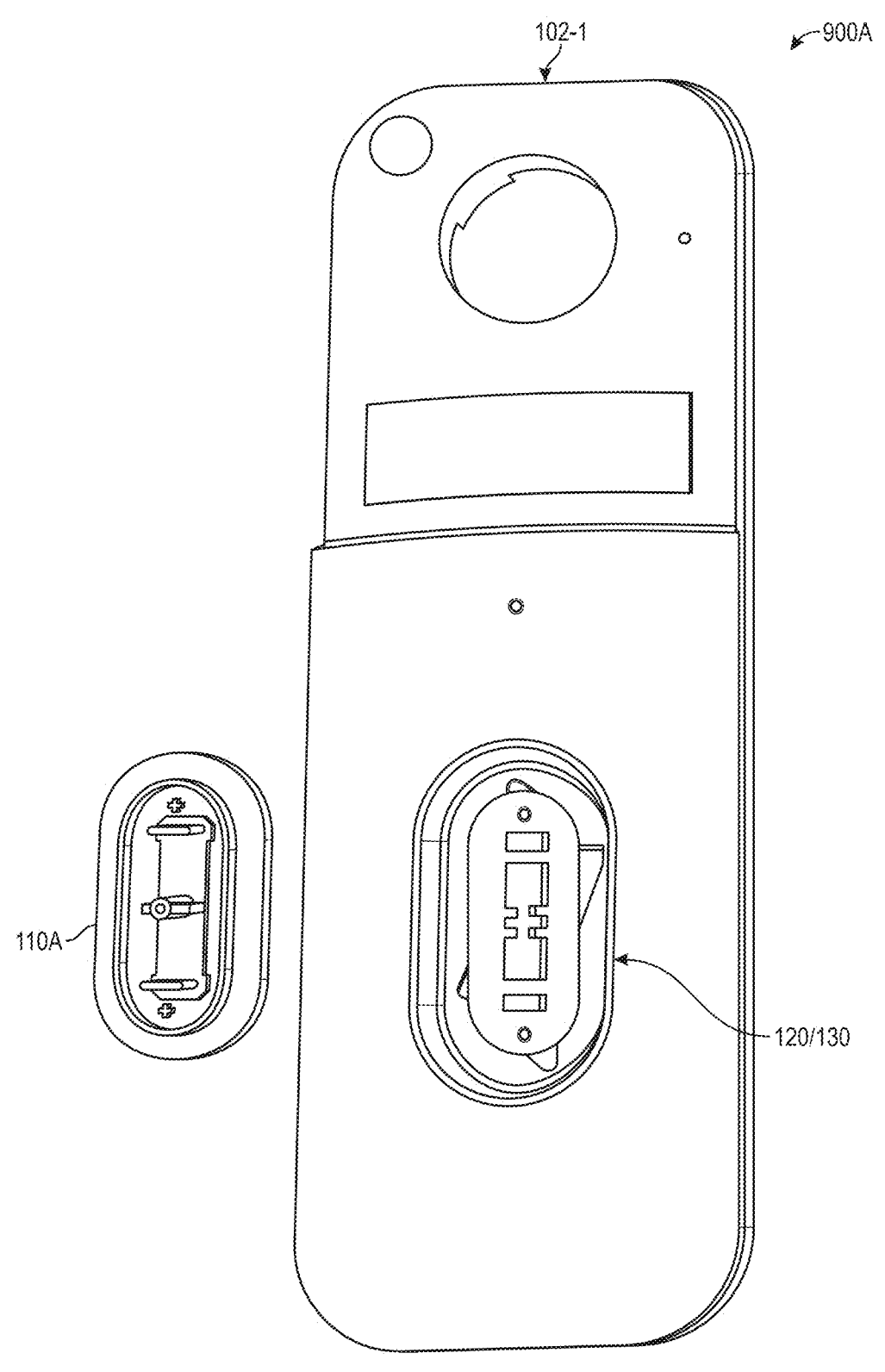
FIG. 9A is a schematic front perspective view diagram of a front portion of the example video doorbell of FIGS. 1A and 1B in a white color, including the light pipe assembly with a white button in a partially assembled state, in accordance with implementations of the present disclosure.

FIG. 9A is a schematic front perspective view diagram 900A of a front portion of the example video doorbell of FIGS. 1A and 1B in a white color, including the light pipe assembly with a white button in a partially assembled state, in accordance with implementations of the present disclosure.

As shown in FIG. 9A, an example electronic device, such as a video doorbell, may comprise a front cover 102-1 to which a light pipe assembly may be installed or inserted. For example, the light pipe assembly may comprise a button 110A, a light pipe 120, a reflector 130, a PCBA (not illustrated), and/or a protective filter (not illustrated).

In the example of FIG. 9A, the electronic device may comprise a white or light-colored device, such that inner and outer surfaces of each of the front cover 102-1 and button 110A may comprise white, high gloss surface finishes. Specifically, by maintaining white, high gloss finishes for an inner surface of the button 110A, as well as for a front side of the reflector 130, reflection and propagation of light within the light pipe 120 may be facilitated to increase overall brightness of illumination of an exit ring of the light pipe 120.

Figure 9B:
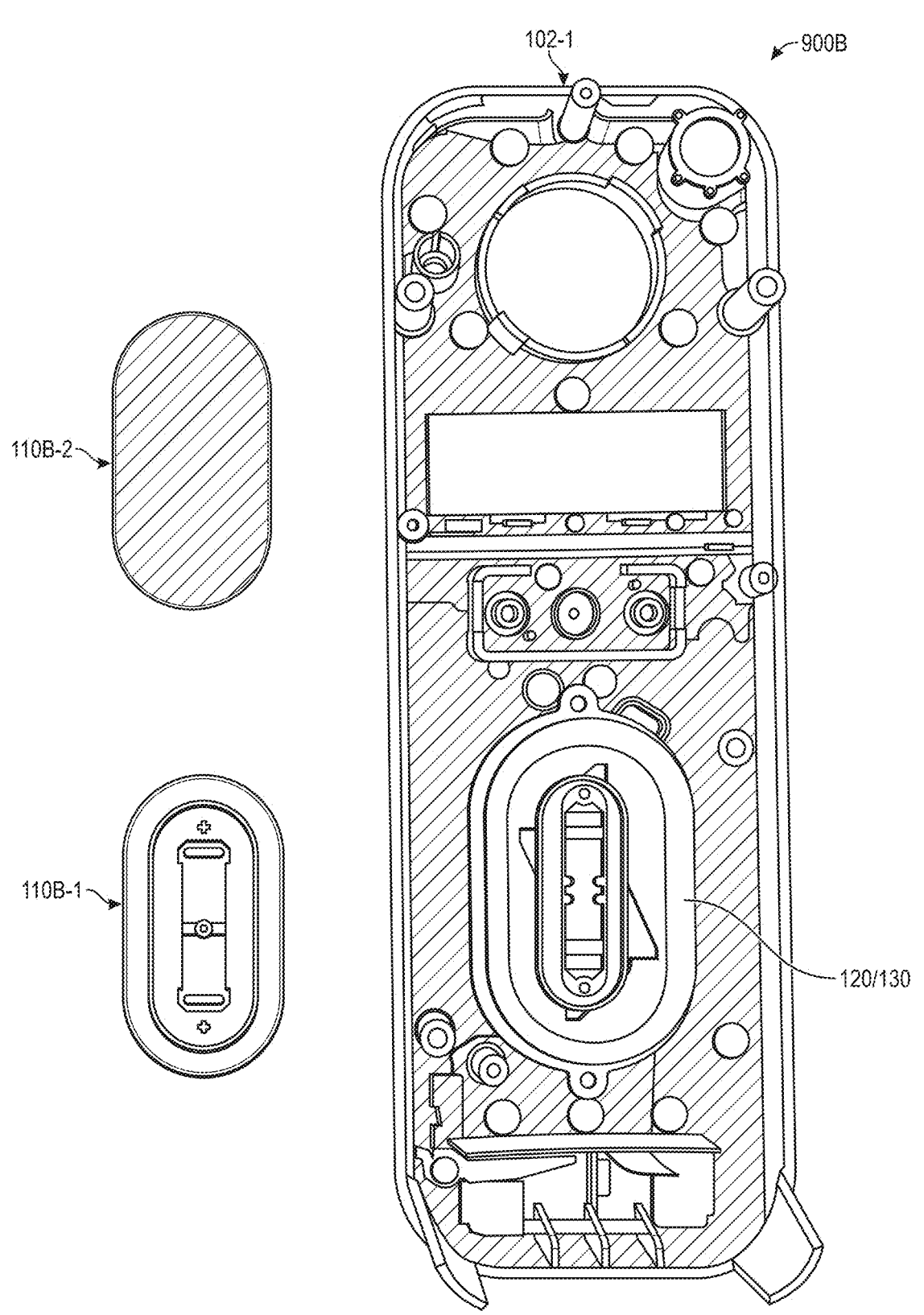
FIG. 9B is a schematic rear perspective view diagram of a front portion of the example video doorbell of FIGS. 1A and 1B in a black color, including the light pipe assembly with a black button in a partially assembled state, in accordance with implementations of the present disclosure.

FIG. 9B is a schematic rear perspective view diagram 900B of a front portion of the example video doorbell of FIGS. 1A and 1B in a black color, including the light pipe assembly with a black button in a partially assembled state, in accordance with implementations of the present disclosure.

As shown in FIG. 9B, an example electronic device, such as a video doorbell, may also comprise a front cover 102-1 to which a light pipe assembly may be installed or inserted. For example, the light pipe assembly may comprise a button 110B with inner and outer parts 110B-1, 110B-2, a light pipe 120, a reflector 130, a PCBA (not illustrated), and/or a protective filter (not illustrated).

In the example of FIG. 9B, the electronic device may comprise a black or dark-colored device, such that inner and outer surfaces of the front cover 102-1 and an outer part 110B-2 of the button 110B may comprise black, dark, or various colors other than white or light colors, as indicated by the hashing in FIG. 9B. However, the inner part 110B-1 of the button, e.g., at least an inner surface of the inner part 110B-1, as well as a front side of the reflector 130 may comprise white, high gloss surface finishes. Specifically, by maintaining white, high gloss finishes for the inner surface of the button 110B, as well as for the front side of the reflector 130, reflection and propagation of light within the light pipe 120 may be facilitated to increase overall brightness of illumination of an exit ring of the light pipe 120, even when the light pipe assembly is inserted or installed within electronic devices that are black, dark, or other colors.

Figure 10:
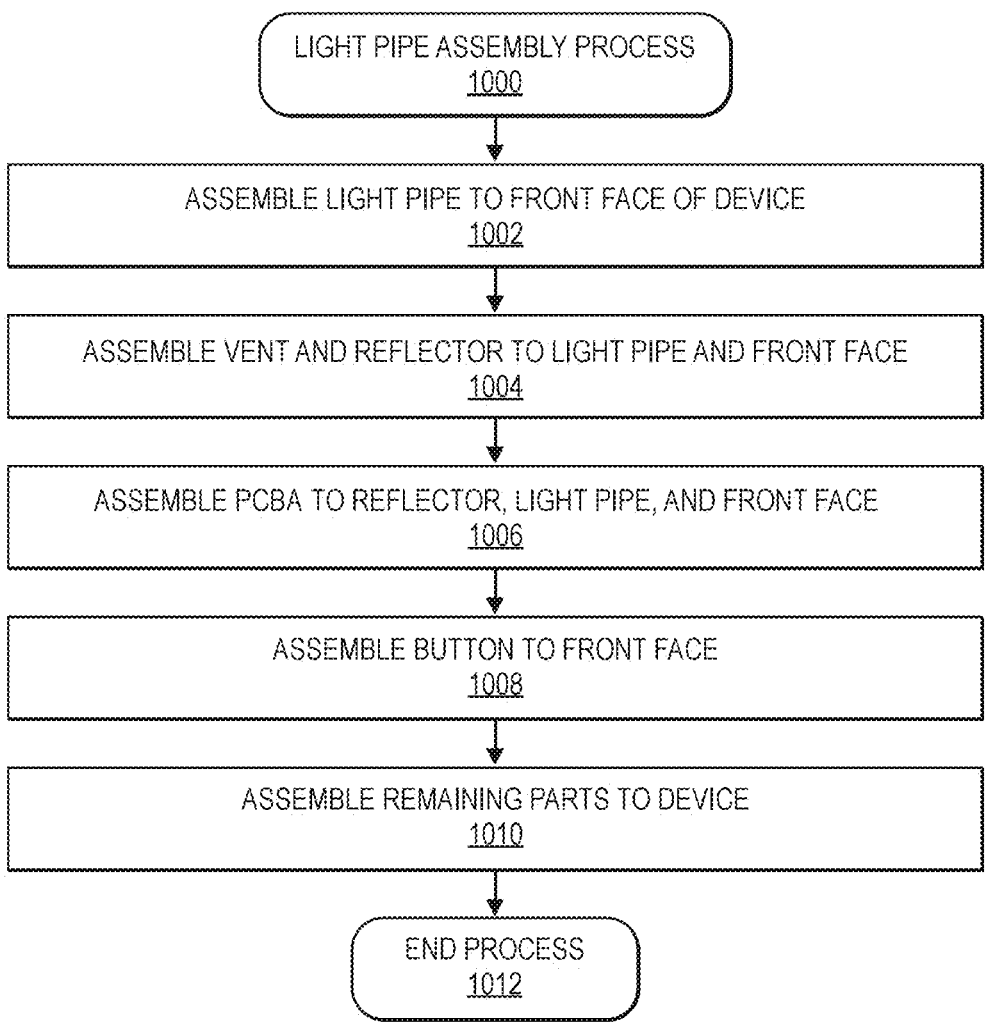
FIG. 10 is a flow diagram illustrating an example light pipe assembly process, in accordance with implementations of the present disclosure.

FIG. 10 is a flow diagram illustrating an example light pipe assembly process 1000, in accordance with implementations of the present disclosure.

The process 1000 may begin by assembling a light pipe to a front face of a device, as at 1002. For example, a light pipe as described herein may be inserted or installed to a front cover of an electronic device, such as a video doorbell or other device. A front face of the light pipe may comprise an exit ring that is intended to be illuminated using one or more LEDs, and the front face may be inserted into an orifice of the front cover, in order to be visible to a user of the device. In addition, the light pipe may be attached or coupled to the front cover using various fasteners, adhesives, welds, or other means.

The process 1000 may continue by assembling a vent and reflector to the light pipe and front face, as at 1004. For example, a protective vent or filter may be attached or adhered to an inner or central portion of the light pipe to prevent ingress of dust or moisture to internal portions of the electronic device. In addition, a reflector may be inserted or installed to a rear face of the light pipe. The reflector may comprise an annular surface that mates or corresponds with an annular, chamfered or curved surface that extends around an outer circumference of a rear face of the light pipe. As described herein, various surfaces of the reflector may facilitate reflection and propagation of light within the light pipe to uniformly illuminate the exit ring. Further, the vent and reflector may be attached or coupled to the light pipe and/or front cover using various fasteners, adhesives, welds, or other means.

The process 1000 may proceed by assembling a PCBA to the reflector, light pipe, and front face, as at 1006. For example, the printed circuit board assembly (PCBA) may comprise a plurality of LEDs that are configured to emit and direct light into a plurality of light channels of the light pipe to illuminate the exit ring. In addition, the PCBA may comprise processors, memories, switches, connectors, or other electronic components configured to perform various operations or functions associated with the electronic device. As described herein, various surfaces of the PCBA may facilitate reflection and propagation of light within the light pipe to uniformly illuminate the exit ring. Further, the PCBA may be attached or coupled to the reflector, light pipe, and/or front cover using various fasteners, adhesives, welds, or other means.

The process 1000 may then continue to assemble a button to the front face, as at 1008. For example, the button may comprise an actuatable element that is associated with a front cover of the electronic device, which may be depressed or pushed in order to initiate one or more operations or functions associated with the device. The button may be inserted or installed to an inner or central portion of the light pipe, via one or more button flanges or other retaining elements that enable both retention and actuation of the button. As described herein, various surfaces of the button may facilitate reflection and propagation of light within the light pipe to uniformly illuminate the exit ring.

The process 1000 may proceed to assemble remaining parts to the device, as at 1010. For example, various other parts, electronic components, connectors, batteries, covers or housings, seals, or other elements may be comprised in various types of electronic devices. The various components may be assembled together with the light pipe assembly described herein as part of such electronic devices, in order to provide desired functionality and operations. Further, the various components may be attached or coupled to the light pipe assembly and/or front cover to form electronic devices using various fasteners, adhesives, welds, or other means.

The process 1000 may then end, as at 1012.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIG. 10, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A light pipe assembly, comprising:
   an elliptical light pipe having four light channels to receive and direct light from four respective light emitting diodes (LEDs) to an exit ring, the four light channels extending at least partially circumferentially around the light pipe, and the light pipe including a front face with the exit ring and a rear face including an annular surface that extends around an outer circumference of the rear face and that is configured to reflect light to the exit ring;
   a reflector positioned adjacent the annular surface of the rear face of the light pipe;
   a printed circuit board assembly (PCBA) positioned adjacent the rear face of the light pipe, the four LEDs being coupled to the PCBA; and
   a button positioned within the exit ring of the front face of the light pipe;
   wherein the reflector, the PCBA, and the button comprise a white, glossy surface finish.

2. The light pipe assembly of claim 1, wherein the reflector comprises an elliptical ring having an inner, annular surface that substantially mates with the annular surface of the rear face of the light pipe; and
   wherein the inner, annular surface of the elliptical ring comprises the white, glossy surface finish.

3. The light pipe assembly of claim 1, wherein a surface of the PCBA that is positioned adjacent the rear face of the light pipe comprises the white, glossy surface finish.

4. The light pipe assembly of claim 1, wherein the button includes an outer face and an inner face;
   wherein the inner face of the button comprises the white, glossy surface finish; and
   wherein the outer face of the button comprises a color different from the inner face.

5. The light pipe assembly of claim 1, wherein the white, glossy surface finish of the reflector, the PCBA, and the button is configured to increase a brightness of the light that is directed via the four light channels and the annular surface to the exit ring of the light pipe.

6. A light pipe, comprising:
   a body comprising:
   a front face with an exit ring configured to emit light;
   a rear face with at least two light channels configured to receive and direct light from at least two respective light emitting diodes (LEDs) to the exit ring, the at least two light channels extending at least partially circumferentially around the body; and
   an annular surface that extends around an outer circumference of the rear face, the annular surface configured to reflect light toward the exit ring;
   wherein the annular surface comprises a chamfered surface that is angled relative to the rear face, the chamfered surface configured to reflect light from the at least two light channels toward the exit ring.

7. The light pipe of claim 6, wherein the at least two light channels are configured to direct light at least partially circumferentially around the body.

8. The light pipe of claim 6, wherein the at least two light channels include respective angled, planar surfaces that are configured to reflect light at least partially radially away from a center of the body and toward the annular surface.

9. The light pipe of claim 6, wherein the chamfered surface is angled approximately forty-five degrees relative to the rear face.

10. The light pipe of claim 6, wherein the body comprises a shape that is at least one of a stadium shape, an elliptical shape, an oval shape, or a circular shape.

11. The light pipe of claim 6, wherein the at least two light channels include respective interfaces to receive light from the at least two respective LEDs; and wherein the respective interfaces comprise air gaps between the at least two light channels and the at least two respective LEDs.

12. The light pipe of claim 11, wherein the at least two light channels comprise four light channels, and the at least two respective LEDs comprise four respective LEDs;

wherein the respective interfaces comprise four interfaces between the four light channels and the four respective LEDs; and wherein the body comprises a stadium shape having two opposing straight portions and two opposing curved portions.

13. The light pipe of claim 12, wherein first and second interfaces of the four interfaces are positioned proximate a first curved portion of the two opposing curved portions of the stadium shape of the body; and wherein third and fourth interfaces of the four interfaces are positioned proximate a second curved portion of the two opposing curved portions of the stadium shape of the body.

14. The light pipe of claim 6, wherein a thickness of the at least two light channels is selected to reduce refraction and loss of light while being directed to the exit ring.

15. The light pipe of claim 6, wherein surfaces of the at least two light channels and the annular surface comprise a glossy surface finish to reflect light within the body.

16. A method of forming a light pipe assembly, comprising:

assembling a printed circuit board assembly (PCBA) to a rear face of a light pipe;

wherein the PCBA includes at least two light emitting diodes (LEDs);

wherein the light pipe includes a front face with an exit ring, and a rear face with at least two light channels and an annular surface configured to reflect light to the exit ring, the at least two light channels extending at least partially circumferentially around the light pipe; and wherein the at least two light channels are configured to receive and direct light from respective LEDs of the at least two LEDs to the exit ring via the annular surface; and wherein the annular surface comprises a chamfered surface that is angled relative to the rear face, the chamfered surface configured to reflect light from the at least two light channels toward the exit ring.

17. The method of forming a light pipe assembly of claim 16, further comprising:

assembling a reflector to the rear face of the light pipe;

wherein the reflector comprises an inner circumferential surface that mates with the annular surface of the light pipe.

18. The method of forming a light pipe assembly of claim 17, further comprising:

assembling a button within the exit ring of the front face of the light pipe;

wherein the button comprises an inner surface that is positioned proximate the front face of the light pipe.

19. The method of forming a light pipe assembly of claim 18, further comprising:

polishing or painting at least one of the PCBA, the inner circumferential surface of the reflector, or the inner surface of the button to form a white, glossy surface finish.

20. The method of forming a light pipe assembly of claim 18, further comprising:

forming, via double shot molding, the button with an inner part and an outer part;

wherein the inner part is formed with the inner surface having a white, glossy surface finish.

\* \* \* \* \*